US009294391B1

(12) United States Patent
Mostert

(10) Patent No.: US 9,294,391 B1
(45) Date of Patent: Mar. 22, 2016

(54) MANAGING NETWORK COMPUTING COMPONENTS UTILIZING REQUEST ROUTING

(71) Applicant: Amazon Technologies, Inc., Seattle, WA (US)

(72) Inventor: André Mostert, Cape Town (ZA)

(73) Assignee: Amazon Technologies, Inc., Seattle, WA (US)

( * ) Notice: Subject to any disclaimer, the term of this patent is extended or adjusted under 35 U.S.C. 154(b) by 311 days.

(21) Appl. No.: 13/909,705

(22) Filed: Jun. 4, 2013

(51) Int. Cl.
*G06F 15/173* (2006.01)
*H04L 12/717* (2013.01)
(Continued)

(52) U.S. Cl.
CPC ............ *H04L 45/42* (2013.01); *H04L 12/1813* (2013.01); *H04L 41/04* (2013.01); *H04L 41/046* (2013.01); *H04L 43/04* (2013.01);
(Continued)

(58) Field of Classification Search
CPC ..... H04L 67/10; H04L 51/32; H04L 63/1416; H04L 67/02; H04L 43/04; H04L 47/12; H04L 47/20; H04L 47/70; H04L 63/10; H04L 63/20; H04L 67/28; H04L 12/1813; H04L 41/04; H04L 41/046; H04L 41/0803
USPC .................... 709/244, 239, 238; 707/999.003
See application file for complete search history.

(56) References Cited

U.S. PATENT DOCUMENTS 5,063,500 A 11/1991 Shorter
5,341,477 A 8/1994 Pitkin et al.
(Continued)

FOREIGN PATENT DOCUMENTS

CA 2741895 A1 * 5/2010
CN 1422468 A 6/2003
(Continued)

OTHER PUBLICATIONS

American Bar Association; Digital Signature Guidelines Tutorial [online]; Feb. 10, 2002 [retrieved on Mar. 2, 2010]; American Bar Association Section of Science and Technology Information Security Committee; Retrieved from the internet: (URL: http://web.archive.org/web/20020210124615/www.abanet.org/scitech/ec/isc/dsg-tutorial.html; pp. 1-8.
(Continued)

*Primary Examiner* — Richard G Keehn
(74) *Attorney, Agent, or Firm* — Knobbe Martens Olson & Bear LLP

(57) ABSTRACT

Aspects of the disclosure will be described with regard to the processing of a client computing device DNS queries by a DNS processing service to determine an identifier associated with a previously instantiated hosted virtual machine instance. In one aspect, if the previously instantiated hosted virtual machine instance is instantiated, the DNS service can resolve the DNS query by transmitting network address information associated with the previously instantiated hosted virtual machine instance. In another aspect, if the previously instantiated hosted virtual machine instance is not instantiated, the DNS service can initiate a process to cause an instantiation of a hosted virtual machine instance based on the previously instantiated hosted virtual machine instance. The DNS service can then resolve the DNS query by transmitting network address information, or an alternative identifier, associated with the newly instantiated hosted virtual machine instance.

25 Claims, 8 Drawing Sheets

(51) Int. Cl.
  *H04L 29/08* (2006.01)
  *H04L 12/18* (2006.01)
  *H04L 12/24* (2006.01)
  *H04L 29/06* (2006.01)
  *H04L 12/26* (2006.01)
  *H04L 12/813* (2013.01)
  *H04L 12/911* (2013.01)
  *H04L 12/58* (2006.01)
  *H04L 12/801* (2013.01)

(52) U.S. Cl.
  CPC ............. *H04L 47/12* (2013.01); *H04L 47/20* (2013.01); *H04L 47/70* (2013.01); *H04L 51/32* (2013.01); *H04L 63/10* (2013.01); *H04L 63/1416* (2013.01); *H04L 63/20* (2013.01); *H04L 67/02* (2013.01); *H04L 67/10* (2013.01); *H04L 67/28* (2013.01)

(56) References Cited

U.S. PATENT DOCUMENTS

| | | |
|---|---|---|
| 5,459,837 A | 10/1995 | Caccavale |
| 5,611,049 A | 3/1997 | Pitts |
| 5,701,467 A | 12/1997 | Freeston |
| 5,764,910 A | 6/1998 | Shachar |
| 5,774,660 A | 6/1998 | Brendel et al. |
| 5,852,717 A | 12/1998 | Bhide et al. |
| 5,892,914 A | 4/1999 | Pitts |
| 5,893,116 A | 4/1999 | Simmonds et al. |
| 5,895,462 A | 4/1999 | Toki |
| 5,933,811 A | 8/1999 | Angles et al. |
| 5,937,427 A | 8/1999 | Shinagawa et al. |
| 5,974,454 A | 10/1999 | Apfel et al. |
| 6,016,512 A | 1/2000 | Huitema |
| 6,026,452 A | 2/2000 | Pitts |
| 6,038,601 A | 3/2000 | Lambert et al. |
| 6,052,718 A | 4/2000 | Gifford |
| 6,078,960 A | 6/2000 | Ballard |
| 6,085,234 A | 7/2000 | Pitts et al. |
| 6,092,100 A | 7/2000 | Berstis et al. |
| 6,098,096 A | 8/2000 | Tsirigotis et al. |
| 6,108,703 A | 8/2000 | Leighton et al. |
| 6,128,279 A | 10/2000 | O'Neil et al. |
| 6,157,942 A | 12/2000 | Chu et al. |
| 6,167,438 A | 12/2000 | Yates et al. |
| 6,167,446 A | 12/2000 | Lister et al. |
| 6,182,111 B1 | 1/2001 | Inohara et al. |
| 6,182,125 B1 | 1/2001 | Borella et al. |
| 6,185,598 B1 | 2/2001 | Farber et al. |
| 6,192,051 B1 | 2/2001 | Lipman et al. |
| 6,205,475 B1 | 3/2001 | Pitts |
| 6,223,288 B1 | 4/2001 | Byrne |
| 6,243,761 B1 | 6/2001 | Mogul et al. |
| 6,275,496 B1 | 8/2001 | Burns et al. |
| 6,286,043 B1 | 9/2001 | Cuomo et al. |
| 6,286,084 B1 | 9/2001 | Wexler et al. |
| 6,304,913 B1 | 10/2001 | Rune |
| 6,324,580 B1 | 11/2001 | Jindal et al. |
| 6,330,602 B1 | 12/2001 | Law et al. |
| 6,338,082 B1 | 1/2002 | Schneider |
| 6,345,308 B1 | 2/2002 | Abe |
| 6,351,743 B1 | 2/2002 | DeArdo et al. |
| 6,351,775 B1 | 2/2002 | Yu |
| 6,363,411 B1 | 3/2002 | Dugan et al. |
| 6,366,952 B2 | 4/2002 | Pitts |
| 6,374,290 B1 | 4/2002 | Scharber et al. |
| 6,377,257 B1 | 4/2002 | Borrel et al. |
| 6,386,043 B1 | 5/2002 | Millins |
| 6,405,252 B1 | 6/2002 | Gupta et al. |
| 6,411,967 B1 | 6/2002 | Van Renesse |
| 6,415,280 B1 | 7/2002 | Farber et al. |
| 6,430,607 B1 | 8/2002 | Kavner |
| 6,438,592 B1 | 8/2002 | Killian |
| 6,442,165 B1 | 8/2002 | Sitaraman et al. |
| 6,452,925 B1 | 9/2002 | Sistanizadeh et al. |
| 6,457,047 B1 | 9/2002 | Chandra et al. |
| 6,459,909 B1 | 10/2002 | Bilcliff et al. |
| 6,473,804 B1 | 10/2002 | Kaiser et al. |
| 6,505,241 B2 | 1/2003 | Pitts |
| 6,523,036 B1 | 2/2003 | Hickman et al. |
| 6,529,910 B1 | 3/2003 | Fleskes |
| 6,529,953 B1 | 3/2003 | Van Renesse |
| 6,553,413 B1 | 4/2003 | Leighton et al. |
| 6,560,610 B1 | 5/2003 | Eatherton et al. |
| 6,611,873 B1 | 8/2003 | Kanehara |
| 6,643,357 B2 | 11/2003 | Lumsden |
| 6,643,707 B1 | 11/2003 | Booth |
| 6,654,807 B2 | 11/2003 | Farber et al. |
| 6,658,462 B1 | 12/2003 | Dutta |
| 6,665,706 B2 | 12/2003 | Kenner et al. |
| 6,678,717 B1 | 1/2004 | Schneider |
| 6,678,791 B1 | 1/2004 | Jacobs et al. |
| 6,681,282 B1 | 1/2004 | Golden et al. |
| 6,694,358 B1 | 2/2004 | Swildens et al. |
| 6,697,805 B1 | 2/2004 | Choquier et al. |
| 6,724,770 B1 | 4/2004 | Van Renesse |
| 6,732,237 B1 | 5/2004 | Jacobs et al. |
| 6,754,699 B2 | 6/2004 | Swildens et al. |
| 6,754,706 B1 | 6/2004 | Swildens et al. |
| 6,760,721 B1 | 7/2004 | Chasen et al. |
| 6,769,031 B1 | 7/2004 | Bero |
| 6,782,398 B1 | 8/2004 | Bahl |
| 6,785,704 B1 | 8/2004 | McCanne |
| 6,795,434 B1 | 9/2004 | Kumar et al. |
| 6,799,214 B1 | 9/2004 | Li |
| 6,804,706 B2 | 10/2004 | Pitts |
| 6,810,291 B2 | 10/2004 | Card et al. |
| 6,810,411 B1 | 10/2004 | Coughlin et al. |
| 6,829,654 B1 | 12/2004 | Jungck |
| 6,862,607 B1 | 3/2005 | Vermeulen |
| 6,874,017 B1 | 3/2005 | Inoue et al. |
| 6,917,951 B2 | 7/2005 | Orbits et al. |
| 6,928,467 B2 | 8/2005 | Peng |
| 6,928,485 B1 | 8/2005 | Krishnamurthy et al. |
| 6,941,562 B2 | 9/2005 | Gao et al. |
| 6,963,850 B1 | 11/2005 | Bezos et al. |
| 6,976,090 B2 | 12/2005 | Ben-Shaul et al. |
| 6,981,017 B1 | 12/2005 | Kasriel et al. |
| 6,985,945 B2 | 1/2006 | Farhat et al. |
| 6,986,018 B2 | 1/2006 | O'Rourke et al. |
| 6,990,526 B1 | 1/2006 | Zhu |
| 6,996,616 B1 | 2/2006 | Leighton et al. |
| 7,003,555 B1 | 2/2006 | Jungck |
| 7,006,099 B2 | 2/2006 | Gut et al. |
| 7,007,089 B2 | 2/2006 | Freedman |
| 7,010,578 B1 | 3/2006 | Lewin et al. |
| 7,010,598 B2 | 3/2006 | Sitaraman et al. |
| 7,024,466 B2 | 4/2006 | Outten et al. |
| 7,031,445 B2 | 4/2006 | Lumsden |
| 7,032,010 B1 | 4/2006 | Swildens et al. |
| 7,058,706 B1 | 6/2006 | Iyer et al. |
| 7,058,953 B2 | 6/2006 | Willard et al. |
| 7,065,587 B2 | 6/2006 | Huitema et al. |
| 7,072,982 B2 | 7/2006 | Teodosiu et al. |
| 7,076,633 B2 | 7/2006 | Tormasov et al. |
| 7,082,476 B1 | 7/2006 | Cohen et al. |
| 7,086,061 B1 | 8/2006 | Joshi et al. |
| 7,092,505 B2 | 8/2006 | Allison et al. |
| 7,092,997 B1 | 8/2006 | Kasriel et al. |
| 7,096,266 B2 | 8/2006 | Lewin et al. |
| 7,099,936 B2 | 8/2006 | Chase et al. |
| 7,103,645 B2 | 9/2006 | Leighton et al. |
| 7,114,160 B2 | 9/2006 | Suryanarayana et al. |
| 7,117,262 B2 | 10/2006 | Bai et al. |
| 7,133,905 B2 | 11/2006 | Dilley et al. |
| 7,136,922 B2 | 11/2006 | Sundaram et al. |
| 7,139,821 B1 | 11/2006 | Shah et al. |
| 7,143,169 B1 | 11/2006 | Champagne et al. |
| 7,143,170 B2 | 11/2006 | Swildens et al. |
| 7,146,560 B2 | 12/2006 | Dang et al. |
| 7,149,809 B2 | 12/2006 | Barde et al. |
| 7,152,118 B2 | 12/2006 | Anderson, IV et al. |
| 7,162,539 B2 | 1/2007 | Garcie-Luna-Aceves |

(56) References Cited

U.S. PATENT DOCUMENTS

| | | |
|---|---|---|
| 7,174,382 B2 | 2/2007 | Ramanathan et al. |
| 7,185,063 B1 | 2/2007 | Kasriel et al. |
| 7,185,084 B2 | 2/2007 | Sirivara et al. |
| 7,188,214 B1 | 3/2007 | Kasriel et al. |
| 7,194,522 B1 | 3/2007 | Swildens et al. |
| 7,200,667 B2 | 4/2007 | Teodosiu et al. |
| 7,216,170 B2 | 5/2007 | Ludvig et al. |
| 7,225,254 B1 | 5/2007 | Swildens et al. |
| 7,228,350 B2 | 6/2007 | Hong et al. |
| 7,228,359 B1 | 6/2007 | Monteiro |
| 7,233,978 B2 | 6/2007 | Overton et al. |
| 7,240,100 B1 | 7/2007 | Wein et al. |
| 7,251,675 B1 | 7/2007 | Kamakura et al. |
| 7,254,626 B1 | 8/2007 | Kommula et al. |
| 7,254,636 B1 | 8/2007 | O'Toole, Jr. et al. |
| 7,257,581 B1 | 8/2007 | Steele et al. |
| 7,260,598 B1 | 8/2007 | Liskov et al. |
| 7,260,639 B2 | 8/2007 | Afergan et al. |
| 7,269,784 B1 | 9/2007 | Kasriel et al. |
| 7,274,658 B2 | 9/2007 | Bornstein et al. |
| 7,289,519 B1 | 10/2007 | Liskov |
| 7,293,093 B2 | 11/2007 | Leighton |
| 7,308,499 B2 | 12/2007 | Chavez |
| 7,310,686 B2 | 12/2007 | Uysal |
| 7,316,648 B2 | 1/2008 | Kelly et al. |
| 7,320,131 B1 | 1/2008 | O'Toole, Jr. |
| 7,321,918 B2 | 1/2008 | Burd et al. |
| 7,339,937 B2 | 3/2008 | Mitra et al. |
| 7,363,291 B1 | 4/2008 | Page |
| 7,363,626 B2 | 4/2008 | Koutharapu et al. |
| 7,370,089 B2 | 5/2008 | Boyd et al. |
| 7,373,416 B2 | 5/2008 | Kagan et al. |
| 7,376,736 B2 | 5/2008 | Sundaram et al. |
| 7,380,078 B2 | 5/2008 | Ikegaya et al. |
| 7,392,236 B2 | 6/2008 | Rusch et al. |
| 7,398,301 B2 | 7/2008 | Hennessey et al. |
| 7,406,512 B2 | 7/2008 | Swildens et al. |
| 7,406,522 B2 | 7/2008 | Riddle |
| 7,430,610 B2 | 9/2008 | Pace et al. |
| 7,441,045 B2 | 10/2008 | Skene et al. |
| 7,454,457 B1 | 11/2008 | Lowery et al. |
| 7,454,500 B1 | 11/2008 | Hsu et al. |
| 7,461,170 B1 | 12/2008 | Taylor et al. |
| 7,464,142 B2 | 12/2008 | Flurry et al. |
| 7,478,148 B2 | 1/2009 | Neerdaels |
| 7,492,720 B2 | 2/2009 | Pruthi et al. |
| 7,496,651 B1 | 2/2009 | Joshi |
| 7,499,998 B2 | 3/2009 | Toebes et al. |
| 7,502,836 B1 | 3/2009 | Menditto et al. |
| 7,505,464 B2 | 3/2009 | Okmianski et al. |
| 7,519,720 B2 | 4/2009 | Fishman et al. |
| 7,519,726 B2 | 4/2009 | Palliyil et al. |
| 7,523,181 B2 | 4/2009 | Swildens et al. |
| 7,543,024 B2 | 6/2009 | Holstege |
| 7,548,947 B2 | 6/2009 | Kasriel et al. |
| 7,552,235 B2 | 6/2009 | Chase et al. |
| 7,555,542 B1 | 6/2009 | Ayers et al. |
| 7,561,571 B1 | 7/2009 | Lovett et al. |
| 7,565,407 B1 | 7/2009 | Hayball |
| 7,568,032 B2 | 7/2009 | Feng et al. |
| 7,573,916 B1 | 8/2009 | Bechtolsheim et al. |
| 7,574,499 B1 | 8/2009 | Swildens et al. |
| 7,581,009 B1 | 8/2009 | Hsu et al. |
| 7,594,189 B1 | 9/2009 | Walker et al. |
| 7,596,619 B2 | 9/2009 | Leighton et al. |
| 7,617,222 B2 | 11/2009 | Coulthard et al. |
| 7,623,460 B2 | 11/2009 | Miyazaki |
| 7,624,169 B2 | 11/2009 | Lisiecki et al. |
| 7,631,101 B2 | 12/2009 | Sullivan et al. |
| 7,640,296 B2 | 12/2009 | Fuchs et al. |
| 7,650,376 B1 | 1/2010 | Blumenau |
| 7,653,700 B1 | 1/2010 | Bahl et al. |
| 7,653,725 B2 | 1/2010 | Yahiro et al. |
| 7,657,613 B1 | 2/2010 | Hanson et al. |
| 7,657,622 B1 | 2/2010 | Douglis et al. |
| 7,661,027 B2 | 2/2010 | Langen et al. |
| 7,664,831 B2 | 2/2010 | Cartmell et al. |
| 7,664,879 B2 | 2/2010 | Chan et al. |
| 7,676,570 B2 | 3/2010 | Levy et al. |
| 7,680,897 B1 | 3/2010 | Carter et al. |
| 7,685,251 B2 | 3/2010 | Houlihan et al. |
| 7,693,813 B1 | 4/2010 | Cao et al. |
| 7,702,724 B1 | 4/2010 | Brydon et al. |
| 7,706,740 B2 | 4/2010 | Collins et al. |
| 7,707,314 B2 | 4/2010 | McCarthy et al. |
| 7,711,647 B2 | 5/2010 | Gunaseelan et al. |
| 7,711,788 B2 | 5/2010 | Lev Ran et al. |
| 7,716,367 B1 | 5/2010 | Leighton et al. |
| 7,725,602 B2 | 5/2010 | Liu et al. |
| 7,730,187 B2 | 6/2010 | Raciborski et al. |
| 7,739,400 B2 | 6/2010 | Lindbo et al. |
| 7,747,720 B2 | 6/2010 | Toebes et al. |
| 7,756,913 B1 | 7/2010 | Day |
| 7,756,965 B2 | 7/2010 | Joshi |
| 7,757,202 B2 | 7/2010 | Dahlsted et al. |
| 7,761,572 B1 | 7/2010 | Auerbach |
| 7,765,304 B2 | 7/2010 | Davis et al. |
| 7,769,823 B2 | 8/2010 | Jenny et al. |
| 7,773,596 B1 | 8/2010 | Marques |
| 7,774,342 B1 | 8/2010 | Virdy |
| 7,787,380 B1 | 8/2010 | Aggarwal et al. |
| 7,792,989 B2 | 9/2010 | Toebes et al. |
| 7,805,516 B2 | 9/2010 | Kettler et al. |
| 7,809,597 B2 | 10/2010 | Das et al. |
| 7,813,308 B2 | 10/2010 | Reddy et al. |
| 7,814,229 B1 | 10/2010 | Cabrera et al. |
| 7,818,454 B2 | 10/2010 | Kim et al. |
| 7,827,256 B2 | 11/2010 | Phillips et al. |
| 7,836,177 B2 | 11/2010 | Kasriel et al. |
| 7,873,065 B1 | 1/2011 | Mukerji et al. |
| 7,890,612 B2 | 2/2011 | Todd et al. |
| 7,899,899 B2 | 3/2011 | Joshi |
| 7,904,875 B2 | 3/2011 | Hegyi |
| 7,912,921 B2 | 3/2011 | O'Rourke et al. |
| 7,925,782 B2 | 4/2011 | Sivasubramanian et al. |
| 7,930,393 B1 | 4/2011 | Baumback et al. |
| 7,930,402 B2 | 4/2011 | Swildens et al. |
| 7,930,427 B2 | 4/2011 | Josefsberg et al. |
| 7,933,988 B2 | 4/2011 | Nasuto et al. |
| 7,937,477 B1 | 5/2011 | Day et al. |
| 7,945,693 B2 | 5/2011 | Farber et al. |
| 7,949,779 B2 | 5/2011 | Farber et al. |
| 7,958,222 B1 | 6/2011 | Pruitt et al. |
| 7,958,258 B2 | 6/2011 | Yeung et al. |
| 7,962,597 B2 | 6/2011 | Richardson et al. |
| 7,966,404 B2 | 6/2011 | Hedin et al. |
| 7,970,816 B2 | 6/2011 | Chess et al. |
| 7,970,940 B1 | 6/2011 | van de Ven et al. |
| 7,979,509 B1 | 7/2011 | Malmskog et al. |
| 7,991,910 B2 | 8/2011 | Richardson et al. |
| 7,996,533 B2 | 8/2011 | Leighton et al. |
| 7,996,535 B2 | 8/2011 | Auerbach |
| 8,000,724 B1 | 8/2011 | Rayburn et al. |
| 8,010,707 B2 | 8/2011 | Elzur et al. |
| 8,019,869 B2 | 9/2011 | Kriegsman |
| 8,024,441 B2 | 9/2011 | Kommula et al. |
| 8,028,090 B2 | 9/2011 | Richardson et al. |
| 8,041,773 B2 | 10/2011 | Abu-Ghazaleh et al. |
| 8,041,809 B2 | 10/2011 | Sundaram et al. |
| 8,041,818 B2 | 10/2011 | Gupta et al. |
| 8,065,275 B2 | 11/2011 | Eriksen et al. |
| 8,069,231 B2 | 11/2011 | Schran et al. |
| 8,073,940 B1 | 12/2011 | Richardson et al. |
| 8,082,348 B1 | 12/2011 | Averbuj et al. |
| 8,108,623 B2 | 1/2012 | Krishnaprasad et al. |
| 8,117,306 B1 | 2/2012 | Baumback et al. |
| 8,122,098 B1 | 2/2012 | Richardson et al. |
| 8,122,124 B1 | 2/2012 | Baumback et al. |
| 8,135,820 B2 | 3/2012 | Richardson et al. |
| 8,156,243 B2 | 4/2012 | Richardson et al. |
| 8,190,682 B2 | 5/2012 | Paterson-Jones et al. |
| 8,195,837 B2 | 6/2012 | McCarthy et al. |
| 8,224,986 B1 | 7/2012 | Liskov et al. |
| 8,234,403 B2 | 7/2012 | Richardson et al. |

(56) References Cited

U.S. PATENT DOCUMENTS

| | | | |
|---|---|---|---|
| 8,239,530 B2 | 8/2012 | Sundaram et al. |
| 8,250,211 B2 | 8/2012 | Swildens et al. |
| 8,250,219 B2 | 8/2012 | Raciborski et al. |
| 8,266,288 B2 | 9/2012 | Banerjee et al. |
| 8,266,327 B2 | 9/2012 | Kumar et al. |
| 8,280,998 B2 | 10/2012 | Joshi |
| 8,281,035 B2 | 10/2012 | Farber et al. |
| 8,291,046 B2 | 10/2012 | Farber et al. |
| 8,291,117 B1 | 10/2012 | Eggleston et al. |
| 8,301,645 B1 | 10/2012 | Crook |
| 8,321,568 B2 | 11/2012 | Sivasubramanian et al. |
| 8,402,137 B2 | 3/2013 | Sivasubramanian et al. |
| 8,433,749 B2 | 4/2013 | Wee et al. |
| 8,447,876 B2 | 5/2013 | Verma et al. |
| 8,452,874 B2 | 5/2013 | MacCarthaigh et al. |
| 8,463,877 B1 | 6/2013 | Richardson et al. |
| 8,468,222 B2 | 6/2013 | Sakata et al. |
| 8,468,245 B2 | 6/2013 | Farber et al. |
| 8,473,613 B2 | 6/2013 | Farber et al. |
| 8,478,903 B2 | 7/2013 | Farber et al. |
| 8,504,721 B2 | 8/2013 | Hsu et al. |
| 8,510,428 B2 | 8/2013 | Joshi |
| 8,510,807 B1 | 8/2013 | Elazary et al. |
| 8,521,851 B1 | 8/2013 | Richardson et al. |
| 8,521,908 B2 | 8/2013 | Holmes et al. |
| 8,526,405 B2 | 9/2013 | Curtis et al. |
| 8,527,658 B2 | 9/2013 | Holmes et al. |
| 8,572,208 B2 | 10/2013 | Farber et al. |
| 8,572,210 B2 | 10/2013 | Farber et al. |
| 8,577,992 B1 | 11/2013 | Richardson et al. |
| 8,589,996 B2 | 11/2013 | Ma et al. |
| 8,606,996 B2 | 12/2013 | Richardson et al. |
| 8,615,549 B2 | 12/2013 | Knowles et al. |
| 8,626,950 B1 | 1/2014 | Richardson et al. |
| 8,635,340 B1 | 1/2014 | Schneider |
| 8,639,817 B2 | 1/2014 | Sivasubramanian et al. |
| 8,645,539 B2 | 2/2014 | McCarthy et al. |
| 8,676,918 B2 | 3/2014 | Richardson et al. |
| 8,683,076 B2 | 3/2014 | Farber et al. |
| 8,688,837 B1 | 4/2014 | Richardson et al. |
| 8,732,309 B1 | 5/2014 | Richardson et al. |
| 8,756,322 B1 | 6/2014 | Lynch |
| 8,756,325 B2 | 6/2014 | Sivasubramanian et al. |
| 8,756,341 B1 | 6/2014 | Richardson et al. |
| 8,782,236 B1 | 7/2014 | Marshall et al. |
| 8,782,279 B2 | 7/2014 | Eggleston et al. |
| 8,819,283 B2 | 8/2014 | Richardson et al. |
| 8,914,514 B1 * | 12/2014 | Jenkins et al. ............... 709/226 |
| 8,924,528 B1 | 12/2014 | Richardson et al. |
| 8,930,513 B1 | 1/2015 | Richardson et al. |
| 8,930,544 B2 | 1/2015 | Richardson et al. |
| 8,938,526 B1 | 1/2015 | Richardson et al. |
| 8,966,318 B1 * | 2/2015 | Shah .............................. 714/41 |
| 9,003,035 B1 | 4/2015 | Richardson et al. |
| 9,009,286 B2 | 4/2015 | Sivasubramanian et al. |
| 9,009,334 B1 * | 4/2015 | Jenkins et al. ............... 709/229 |
| 9,021,127 B2 * | 4/2015 | Richardson et al. .......... 709/238 |
| 9,021,128 B2 | 4/2015 | Sivasubramanian et al. |
| 9,021,129 B2 | 4/2015 | Richardson et al. |
| 9,026,616 B2 | 5/2015 | Sivasubramanian et al. |
| 9,037,975 B1 * | 5/2015 | Taylor et al. ................. 715/733 |
| 9,083,675 B2 | 7/2015 | Richardson et al. |
| 9,083,743 B1 | 7/2015 | Patel et al. |
| 9,106,701 B2 | 8/2015 | Richardson et al. |
| 9,130,756 B2 | 9/2015 | Richardson et al. |
| 2001/0000811 A1 | 5/2001 | May et al. |
| 2001/0025305 A1 | 9/2001 | Yoshiasa et al. |
| 2001/0032133 A1 | 10/2001 | Moran |
| 2001/0034704 A1 | 10/2001 | Farhat et al. |
| 2001/0049741 A1 | 12/2001 | Skene et al. |
| 2001/0056416 A1 | 12/2001 | Garcia-Luna-Aceves |
| 2001/0056500 A1 | 12/2001 | Farber et al. |
| 2002/0002613 A1 | 1/2002 | Freeman et al. |
| 2002/0004846 A1 | 1/2002 | Garcia-Luna-Aceves et al. |
| 2002/0007413 A1 | 1/2002 | Garcia-Luna-Aceves et al. |
| 2002/0010798 A1 | 1/2002 | Ben-Shaul et al. |
| 2002/0048269 A1 | 4/2002 | Hong et al. |
| 2002/0049608 A1 | 4/2002 | Hartsell et al. |
| 2002/0049857 A1 | 4/2002 | Farber et al. |
| 2002/0052942 A1 | 5/2002 | Swildens et al. |
| 2002/0062372 A1 | 5/2002 | Hong et al. |
| 2002/0068554 A1 | 6/2002 | Dusse |
| 2002/0069420 A1 | 6/2002 | Russell et al. |
| 2002/0078233 A1 | 6/2002 | Biliris et al. |
| 2002/0082858 A1 | 6/2002 | Heddaya et al. |
| 2002/0083118 A1 | 6/2002 | Sim |
| 2002/0083148 A1 | 6/2002 | Shaw et al. |
| 2002/0087374 A1 | 7/2002 | Boubez et al. |
| 2002/0091786 A1 | 7/2002 | Yamaguchi et al. |
| 2002/0092026 A1 | 7/2002 | Janniello et al. |
| 2002/0099616 A1 | 7/2002 | Sweldens |
| 2002/0099850 A1 | 7/2002 | Farber et al. |
| 2002/0101836 A1 | 8/2002 | Dorenbosch |
| 2002/0103820 A1 | 8/2002 | Cartmell et al. |
| 2002/0107944 A1 | 8/2002 | Bai et al. |
| 2002/0112049 A1 | 8/2002 | Elnozahy et al. |
| 2002/0116481 A1 | 8/2002 | Lee |
| 2002/0116491 A1 | 8/2002 | Boyd et al. |
| 2002/0120782 A1 | 8/2002 | Dillon et al. |
| 2002/0124047 A1 | 9/2002 | Gartner et al. |
| 2002/0124098 A1 | 9/2002 | Shaw |
| 2002/0129123 A1 | 9/2002 | Johnson et al. |
| 2002/0131428 A1 | 9/2002 | Pecus et al. |
| 2002/0135611 A1 | 9/2002 | Deosaran et al. |
| 2002/0138286 A1 | 9/2002 | Engstrom |
| 2002/0138437 A1 | 9/2002 | Lewin et al. |
| 2002/0143989 A1 | 10/2002 | Huitema et al. |
| 2002/0147770 A1 | 10/2002 | Tang |
| 2002/0147774 A1 | 10/2002 | Lisiecki et al. |
| 2002/0150094 A1 | 10/2002 | Cheng et al. |
| 2002/0156911 A1 | 10/2002 | Croman et al. |
| 2002/0161745 A1 | 10/2002 | Call |
| 2002/0161767 A1 | 10/2002 | Shapiro et al. |
| 2002/0163882 A1 | 11/2002 | Bornstein et al. |
| 2002/0165912 A1 | 11/2002 | Wenocur et al. |
| 2002/0169890 A1 | 11/2002 | Beaumont et al. |
| 2002/0188722 A1 | 12/2002 | Banerjee et al. |
| 2002/0194324 A1 | 12/2002 | Guha |
| 2002/0198953 A1 | 12/2002 | O'Rourke et al. |
| 2003/0002484 A1 | 1/2003 | Freedman |
| 2003/0007482 A1 | 1/2003 | Khello et al. |
| 2003/0009591 A1 | 1/2003 | Hayball et al. |
| 2003/0026410 A1 | 2/2003 | Lumsden |
| 2003/0028642 A1 | 2/2003 | Agarwal et al. |
| 2003/0033283 A1 | 2/2003 | Evans et al. |
| 2003/0037139 A1 | 2/2003 | Shteyn |
| 2003/0065739 A1 | 4/2003 | Shnier |
| 2003/0074401 A1 | 4/2003 | Connell et al. |
| 2003/0079027 A1 | 4/2003 | Slocombe et al. |
| 2003/0093523 A1 | 5/2003 | Cranor et al. |
| 2003/0099202 A1 | 5/2003 | Lear et al. |
| 2003/0099237 A1 | 5/2003 | Mitra et al. |
| 2003/0101278 A1 | 5/2003 | Garcia-Luna-Aceves et al. |
| 2003/0120741 A1 | 6/2003 | Wu et al. |
| 2003/0133554 A1 | 7/2003 | Nykanen et al. |
| 2003/0135509 A1 | 7/2003 | Davis et al. |
| 2003/0140087 A1 | 7/2003 | Lincoln et al. |
| 2003/0145038 A1 | 7/2003 | Tariq et al. |
| 2003/0145066 A1 | 7/2003 | Okada et al. |
| 2003/0149581 A1 | 8/2003 | Chaudhri et al. |
| 2003/0154239 A1 | 8/2003 | Davis et al. |
| 2003/0154284 A1 | 8/2003 | Bernardin et al. |
| 2003/0163722 A1 | 8/2003 | Anderson, IV |
| 2003/0172145 A1 | 9/2003 | Nguyen |
| 2003/0172183 A1 | 9/2003 | Anderson, IV et al. |
| 2003/0172291 A1 | 9/2003 | Judge et al. |
| 2003/0174648 A1 | 9/2003 | Wang et al. |
| 2003/0182305 A1 | 9/2003 | Balva et al. |
| 2003/0182413 A1 | 9/2003 | Allen et al. |
| 2003/0182447 A1 | 9/2003 | Schilling |
| 2003/0187935 A1 | 10/2003 | Agarwalla et al. |
| 2003/0187970 A1 | 10/2003 | Chase et al. |
| 2003/0191822 A1 | 10/2003 | Leighton et al. |
| 2003/0200394 A1 | 10/2003 | Ashmore et al. |

(56) References Cited

U.S. PATENT DOCUMENTS

| | | |
|---|---|---|
| 2003/0204602 A1 | 10/2003 | Hudson et al. |
| 2003/0229682 A1 | 12/2003 | Day |
| 2003/0233423 A1 | 12/2003 | Dilley et al. |
| 2003/0233445 A1 | 12/2003 | Levy et al. |
| 2003/0233455 A1 | 12/2003 | Leber et al. |
| 2003/0236700 A1 | 12/2003 | Arning et al. |
| 2004/0010563 A1 | 1/2004 | Forte et al. |
| 2004/0010621 A1 | 1/2004 | Afergan et al. |
| 2004/0015584 A1 | 1/2004 | Cartmell et al. |
| 2004/0019518 A1 | 1/2004 | Abraham et al. |
| 2004/0024841 A1 | 2/2004 | Becker et al. |
| 2004/0030620 A1 | 2/2004 | Benjamin et al. |
| 2004/0034744 A1 | 2/2004 | Karlsson et al. |
| 2004/0039798 A1 | 2/2004 | Hotz et al. |
| 2004/0044731 A1 | 3/2004 | Chen et al. |
| 2004/0044791 A1 | 3/2004 | Pouzzner |
| 2004/0059805 A1 | 3/2004 | Dinker et al. |
| 2004/0064335 A1 | 4/2004 | Yang |
| 2004/0064501 A1 | 4/2004 | Jan et al. |
| 2004/0073596 A1 | 4/2004 | Kloninger et al. |
| 2004/0073707 A1 | 4/2004 | Dillon |
| 2004/0073867 A1 | 4/2004 | Kausik et al. |
| 2004/0078468 A1 | 4/2004 | Hedin et al. |
| 2004/0078487 A1 | 4/2004 | Cernohous et al. |
| 2004/0083283 A1 | 4/2004 | Sundaram et al. |
| 2004/0083307 A1 | 4/2004 | Uysal |
| 2004/0117455 A1 | 6/2004 | Kaminsky et al. |
| 2004/0128344 A1 | 7/2004 | Trossen |
| 2004/0128346 A1 | 7/2004 | Melamed et al. |
| 2004/0167981 A1 | 8/2004 | Douglas et al. |
| 2004/0167982 A1 | 8/2004 | Cohen et al. |
| 2004/0172466 A1 | 9/2004 | Douglas et al. |
| 2004/0194085 A1 | 9/2004 | Beaubien et al. |
| 2004/0194102 A1 | 9/2004 | Neerdaels |
| 2004/0203630 A1 | 10/2004 | Wang |
| 2004/0205149 A1 | 10/2004 | Dillon et al. |
| 2004/0205162 A1 | 10/2004 | Parikh |
| 2004/0215823 A1 | 10/2004 | Kleinfelter et al. |
| 2004/0221019 A1 | 11/2004 | Swildens et al. |
| 2004/0221034 A1 | 11/2004 | Kausik et al. |
| 2004/0249939 A1 | 12/2004 | Amini et al. |
| 2004/0249971 A1 | 12/2004 | Klinker |
| 2004/0249975 A1 | 12/2004 | Tuck et al. |
| 2004/0254921 A1 | 12/2004 | Cohen et al. |
| 2004/0267906 A1 | 12/2004 | Truty |
| 2004/0267907 A1 | 12/2004 | Gustafsson |
| 2005/0010653 A1 | 1/2005 | McCanne |
| 2005/0021706 A1 | 1/2005 | Maggi et al. |
| 2005/0021862 A1 | 1/2005 | Schroeder et al. |
| 2005/0027882 A1 | 2/2005 | Sullivan et al. |
| 2005/0038967 A1 | 2/2005 | Umbehocker et al. |
| 2005/0044270 A1 | 2/2005 | Grove et al. |
| 2005/0102683 A1 | 5/2005 | Branson et al. |
| 2005/0108169 A1 | 5/2005 | Balasubramanian et al. |
| 2005/0108529 A1 | 5/2005 | Juneau |
| 2005/0114296 A1 | 5/2005 | Farber et al. |
| 2005/0117717 A1 | 6/2005 | Lumsden |
| 2005/0132083 A1 | 6/2005 | Raciborski et al. |
| 2005/0157712 A1 | 7/2005 | Rangarajan et al. |
| 2005/0160133 A1 | 7/2005 | Greenlee et al. |
| 2005/0163168 A1 | 7/2005 | Sheth et al. |
| 2005/0168782 A1 | 8/2005 | Kobashi et al. |
| 2005/0171959 A1 | 8/2005 | Deforche et al. |
| 2005/0188073 A1 | 8/2005 | Nakamichi et al. |
| 2005/0192008 A1 | 9/2005 | Desai et al. |
| 2005/0198334 A1 | 9/2005 | Farber et al. |
| 2005/0198571 A1 | 9/2005 | Kramer et al. |
| 2005/0216569 A1 | 9/2005 | Coppola et al. |
| 2005/0216674 A1 | 9/2005 | Robbin et al. |
| 2005/0229119 A1 | 10/2005 | Torvinen |
| 2005/0232165 A1 | 10/2005 | Brawn et al. |
| 2005/0259672 A1 | 11/2005 | Eduri |
| 2005/0262248 A1 | 11/2005 | Jennings, III et al. |
| 2005/0267991 A1 | 12/2005 | Huitema et al. |
| 2005/0267992 A1 | 12/2005 | Huitema et al. |
| 2005/0267993 A1 | 12/2005 | Huitema et al. |
| 2005/0278259 A1 | 12/2005 | Gunaseelan et al. |
| 2005/0283759 A1 | 12/2005 | Peteanu et al. |
| 2005/0283784 A1 | 12/2005 | Suzuki |
| 2006/0013158 A1 | 1/2006 | Ahuja et al. |
| 2006/0020596 A1 | 1/2006 | Liu et al. |
| 2006/0020684 A1 | 1/2006 | Mukherjee et al. |
| 2006/0020714 A1 | 1/2006 | Girouard et al. |
| 2006/0020715 A1 | 1/2006 | Jungck |
| 2006/0026067 A1 | 2/2006 | Nicholas et al. |
| 2006/0026154 A1 | 2/2006 | Altinel et al. |
| 2006/0036720 A1 | 2/2006 | Faulk, Jr. |
| 2006/0036966 A1 | 2/2006 | Yevdayev |
| 2006/0037037 A1 | 2/2006 | Miranz |
| 2006/0039352 A1 | 2/2006 | Karstens |
| 2006/0041614 A1 | 2/2006 | Oe |
| 2006/0047787 A1 | 3/2006 | Aggarwal et al. |
| 2006/0047813 A1 | 3/2006 | Aggarwal et al. |
| 2006/0059246 A1 | 3/2006 | Grove |
| 2006/0063534 A1 | 3/2006 | Kokkonen et al. |
| 2006/0064476 A1 | 3/2006 | Decasper et al. |
| 2006/0064500 A1 | 3/2006 | Roth et al. |
| 2006/0074750 A1 | 4/2006 | Clark et al. |
| 2006/0075084 A1 | 4/2006 | Lyon |
| 2006/0075139 A1 | 4/2006 | Jungck |
| 2006/0083165 A1 | 4/2006 | McLane et al. |
| 2006/0085536 A1 | 4/2006 | Meyer et al. |
| 2006/0088026 A1 | 4/2006 | Mazur et al. |
| 2006/0112066 A1 | 5/2006 | Hamzy |
| 2006/0112176 A1 | 5/2006 | Liu et al. |
| 2006/0120385 A1 | 6/2006 | Atchison et al. |
| 2006/0129665 A1 | 6/2006 | Toebes et al. |
| 2006/0143293 A1 | 6/2006 | Freedman |
| 2006/0149529 A1 | 7/2006 | Nguyen et al. |
| 2006/0155823 A1 | 7/2006 | Tran et al. |
| 2006/0155862 A1 | 7/2006 | Kathi et al. |
| 2006/0161541 A1 | 7/2006 | Cencini |
| 2006/0168088 A1 | 7/2006 | Leighton et al. |
| 2006/0179080 A1 | 8/2006 | Meek et al. |
| 2006/0184936 A1 | 8/2006 | Abels et al. |
| 2006/0190605 A1 | 8/2006 | Franz et al. |
| 2006/0193247 A1 | 8/2006 | Naseh et al. |
| 2006/0195866 A1 | 8/2006 | Thukral |
| 2006/0206568 A1 | 9/2006 | Verma et al. |
| 2006/0206586 A1 | 9/2006 | Ling et al. |
| 2006/0218265 A1 | 9/2006 | Farber et al. |
| 2006/0218304 A1 | 9/2006 | Mukherjee et al. |
| 2006/0227740 A1 | 10/2006 | McLaughlin et al. |
| 2006/0227758 A1 | 10/2006 | Rana et al. |
| 2006/0230137 A1 | 10/2006 | Gare et al. |
| 2006/0233155 A1 | 10/2006 | Srivastava |
| 2006/0253546 A1 | 11/2006 | Chang et al. |
| 2006/0253609 A1 | 11/2006 | Andreev et al. |
| 2006/0259581 A1 | 11/2006 | Piersol |
| 2006/0259690 A1 | 11/2006 | Vittal et al. |
| 2006/0259984 A1 | 11/2006 | Juneau |
| 2006/0265497 A1 | 11/2006 | Ohata et al. |
| 2006/0265508 A1 | 11/2006 | Angel et al. |
| 2006/0265516 A1 | 11/2006 | Schilling |
| 2006/0265720 A1 | 11/2006 | Cai et al. |
| 2006/0271641 A1 | 11/2006 | Stavrakos et al. |
| 2006/0282522 A1 | 12/2006 | Lewin et al. |
| 2006/0288119 A1 | 12/2006 | Kim et al. |
| 2007/0005689 A1 | 1/2007 | Leighton et al. |
| 2007/0005801 A1 | 1/2007 | Kumar et al. |
| 2007/0005892 A1 | 1/2007 | Mullender et al. |
| 2007/0011267 A1 | 1/2007 | Overton et al. |
| 2007/0014241 A1 | 1/2007 | Banerjee et al. |
| 2007/0021998 A1 | 1/2007 | Laithwaite et al. |
| 2007/0028001 A1 | 2/2007 | Phillips et al. |
| 2007/0038729 A1 | 2/2007 | Sullivan et al. |
| 2007/0038994 A1 | 2/2007 | Davis et al. |
| 2007/0041393 A1 | 2/2007 | Westhead et al. |
| 2007/0043859 A1 | 2/2007 | Ruul |
| 2007/0050522 A1 | 3/2007 | Grove et al. |
| 2007/0050703 A1 | 3/2007 | Lebel |
| 2007/0055764 A1 | 3/2007 | Dilley et al. |
| 2007/0061440 A1 | 3/2007 | Sundaram et al. |
| 2007/0076872 A1 | 4/2007 | Juneau |

(56) References Cited

U.S. PATENT DOCUMENTS

| | | |
|---|---|---|
| 2007/0086429 A1 | 4/2007 | Lawrence et al. |
| 2007/0094361 A1 | 4/2007 | Hoynowski et al. |
| 2007/0101377 A1 | 5/2007 | Six et al. |
| 2007/0118667 A1 | 5/2007 | McCarthy et al. |
| 2007/0118668 A1 | 5/2007 | McCarthy et al. |
| 2007/0134641 A1 | 6/2007 | Lieu |
| 2007/0156919 A1 | 7/2007 | Potti et al. |
| 2007/0162331 A1 | 7/2007 | Sullivan |
| 2007/0168517 A1 | 7/2007 | Weller |
| 2007/0174426 A1 | 7/2007 | Swildens et al. |
| 2007/0174442 A1 | 7/2007 | Sherman et al. |
| 2007/0174490 A1 | 7/2007 | Choi et al. |
| 2007/0183342 A1 | 8/2007 | Wong et al. |
| 2007/0198982 A1 | 8/2007 | Bolan et al. |
| 2007/0204107 A1 | 8/2007 | Greenfield et al. |
| 2007/0208737 A1 | 9/2007 | Li et al. |
| 2007/0219795 A1 | 9/2007 | Park et al. |
| 2007/0220010 A1 | 9/2007 | Ertugrul |
| 2007/0233705 A1 | 10/2007 | Farber et al. |
| 2007/0233706 A1 | 10/2007 | Farber et al. |
| 2007/0233846 A1 | 10/2007 | Farber et al. |
| 2007/0233884 A1 | 10/2007 | Farber et al. |
| 2007/0244964 A1 | 10/2007 | Challenger et al. |
| 2007/0250467 A1 | 10/2007 | Mesnik et al. |
| 2007/0250560 A1 | 10/2007 | Wein et al. |
| 2007/0250601 A1 | 10/2007 | Amlekar et al. |
| 2007/0250611 A1 | 10/2007 | Bhogal et al. |
| 2007/0253377 A1 | 11/2007 | Janneteau et al. |
| 2007/0255843 A1 | 11/2007 | Zubev |
| 2007/0263604 A1 | 11/2007 | Tai |
| 2007/0266113 A1 | 11/2007 | Koopmans et al. |
| 2007/0266311 A1 | 11/2007 | Westphal |
| 2007/0266333 A1 | 11/2007 | Cossey et al. |
| 2007/0270165 A1 | 11/2007 | Poosala |
| 2007/0271375 A1 | 11/2007 | Hwang |
| 2007/0271385 A1 | 11/2007 | Davis et al. |
| 2007/0271560 A1 | 11/2007 | Wahlert et al. |
| 2007/0280229 A1 | 12/2007 | Kenney |
| 2007/0288588 A1 | 12/2007 | Wein et al. |
| 2007/0291739 A1 | 12/2007 | Sullivan et al. |
| 2008/0005057 A1 | 1/2008 | Ozzie et al. |
| 2008/0008089 A1 | 1/2008 | Bornstein et al. |
| 2008/0025304 A1 | 1/2008 | Venkataswami et al. |
| 2008/0037536 A1 | 2/2008 | Padmanabhan et al. |
| 2008/0046550 A1 | 2/2008 | Mazur et al. |
| 2008/0046596 A1 | 2/2008 | Afergan et al. |
| 2008/0065724 A1 | 3/2008 | Seed et al. |
| 2008/0065745 A1 | 3/2008 | Leighton et al. |
| 2008/0071859 A1 | 3/2008 | Seed et al. |
| 2008/0071987 A1 | 3/2008 | Karn et al. |
| 2008/0072264 A1 | 3/2008 | Crayford |
| 2008/0082551 A1 | 4/2008 | Farber et al. |
| 2008/0082662 A1 | 4/2008 | Dandliker et al. |
| 2008/0086574 A1 | 4/2008 | Raciborski et al. |
| 2008/0092242 A1 | 4/2008 | Rowley |
| 2008/0103805 A1 | 5/2008 | Shear et al. |
| 2008/0104268 A1 | 5/2008 | Farber et al. |
| 2008/0114829 A1 | 5/2008 | Button et al. |
| 2008/0125077 A1 | 5/2008 | Velazquez et al. |
| 2008/0126706 A1 | 5/2008 | Newport et al. |
| 2008/0134043 A1 | 6/2008 | Georgis et al. |
| 2008/0140800 A1 | 6/2008 | Farber et al. |
| 2008/0147866 A1 | 6/2008 | Stolorz et al. |
| 2008/0147873 A1 | 6/2008 | Matsumoto |
| 2008/0155061 A1 | 6/2008 | Afergan et al. |
| 2008/0155614 A1 | 6/2008 | Cooper et al. |
| 2008/0162667 A1 | 7/2008 | Verma et al. |
| 2008/0162821 A1 | 7/2008 | Duran et al. |
| 2008/0162843 A1 | 7/2008 | Davis et al. |
| 2008/0172488 A1 | 7/2008 | Jawahar et al. |
| 2008/0189437 A1 | 8/2008 | Halley |
| 2008/0201332 A1 | 8/2008 | Souders et al. |
| 2008/0215718 A1 | 9/2008 | Stolorz et al. |
| 2008/0215730 A1 | 9/2008 | Sundaram et al. |
| 2008/0215735 A1 | 9/2008 | Farber et al. |
| 2008/0215747 A1 | 9/2008 | Menon et al. |
| 2008/0215750 A1 | 9/2008 | Farber et al. |
| 2008/0215755 A1 | 9/2008 | Farber et al. |
| 2008/0222281 A1 | 9/2008 | Dilley et al. |
| 2008/0222291 A1 | 9/2008 | Weller et al. |
| 2008/0222295 A1 | 9/2008 | Robinson et al. |
| 2008/0228574 A1 | 9/2008 | Stewart et al. |
| 2008/0228920 A1 | 9/2008 | Souders et al. |
| 2008/0235400 A1 | 9/2008 | Slocombe et al. |
| 2008/0256175 A1 | 10/2008 | Lee et al. |
| 2008/0275772 A1 | 11/2008 | Suryanarayana et al. |
| 2008/0281946 A1 | 11/2008 | Swildens et al. |
| 2008/0281950 A1 | 11/2008 | Wald et al. |
| 2008/0288722 A1 | 11/2008 | Lecoq et al. |
| 2008/0301670 A1 | 12/2008 | Gouge et al. |
| 2008/0319862 A1 | 12/2008 | Golan et al. |
| 2008/0320123 A1 | 12/2008 | Houlihan et al. |
| 2008/0320269 A1 | 12/2008 | Houlihan et al. |
| 2009/0013063 A1 | 1/2009 | Soman |
| 2009/0016236 A1 | 1/2009 | Alcala et al. |
| 2009/0029644 A1 | 1/2009 | Sue et al. |
| 2009/0031367 A1 | 1/2009 | Sue |
| 2009/0031368 A1 | 1/2009 | Ling |
| 2009/0031376 A1 | 1/2009 | Riley et al. |
| 2009/0049098 A1 | 2/2009 | Pickelsimer et al. |
| 2009/0063038 A1 | 3/2009 | Shrivathsan et al. |
| 2009/0063704 A1 | 3/2009 | Taylor et al. |
| 2009/0070533 A1 | 3/2009 | Elazary et al. |
| 2009/0083228 A1 | 3/2009 | Shatz et al. |
| 2009/0086741 A1 | 4/2009 | Zhang et al. |
| 2009/0089869 A1 | 4/2009 | Varghese |
| 2009/0103707 A1 | 4/2009 | McGary et al. |
| 2009/0106381 A1 | 4/2009 | Kasriel et al. |
| 2009/0112703 A1 | 4/2009 | Brown |
| 2009/0125393 A1 | 5/2009 | Hwang et al. |
| 2009/0125934 A1 | 5/2009 | Jones et al. |
| 2009/0132368 A1 | 5/2009 | Cotter et al. |
| 2009/0132648 A1 | 5/2009 | Swildens et al. |
| 2009/0144412 A1 | 6/2009 | Ferguson et al. |
| 2009/0150926 A1 | 6/2009 | Schlack |
| 2009/0157850 A1 | 6/2009 | Gagliardi et al. |
| 2009/0158163 A1 | 6/2009 | Stephens et al. |
| 2009/0164331 A1 | 6/2009 | Bishop et al. |
| 2009/0177667 A1 | 7/2009 | Ramos et al. |
| 2009/0182815 A1 | 7/2009 | Czechowski et al. |
| 2009/0182837 A1 | 7/2009 | Rogers |
| 2009/0182945 A1 | 7/2009 | Aviles et al. |
| 2009/0187575 A1 | 7/2009 | DaCosta |
| 2009/0204682 A1 | 8/2009 | Jeyaseelan et al. |
| 2009/0210549 A1 | 8/2009 | Hudson et al. |
| 2009/0233623 A1 | 9/2009 | Johnson |
| 2009/0241167 A1 | 9/2009 | Moore |
| 2009/0248786 A1 | 10/2009 | Richardson et al. |
| 2009/0248787 A1 | 10/2009 | Sivasubramanian et al. |
| 2009/0248852 A1 | 10/2009 | Fuhrmann et al. |
| 2009/0248858 A1 | 10/2009 | Sivasubramanian et al. |
| 2009/0248893 A1* | 10/2009 | Richardson et al. .......... 709/239 |
| 2009/0249222 A1 | 10/2009 | Schmidt et al. |
| 2009/0254661 A1 | 10/2009 | Fullagar et al. |
| 2009/0259971 A1 | 10/2009 | Rankine et al. |
| 2009/0271498 A1 | 10/2009 | Cable |
| 2009/0271577 A1 | 10/2009 | Campana et al. |
| 2009/0271730 A1 | 10/2009 | Rose et al. |
| 2009/0279444 A1 | 11/2009 | Ravindran et al. |
| 2009/0282038 A1 | 11/2009 | Subotin et al. |
| 2009/0287750 A1 | 11/2009 | Banavar et al. |
| 2009/0307307 A1 | 12/2009 | Igarashi |
| 2009/0327489 A1 | 12/2009 | Swildens et al. |
| 2009/0327517 A1* | 12/2009 | Sivasubramanian et al. . 709/238 |
| 2009/0327914 A1 | 12/2009 | Adar et al. |
| 2010/0005175 A1 | 1/2010 | Swildens et al. |
| 2010/0011061 A1 | 1/2010 | Hudson et al. |
| 2010/0011126 A1 | 1/2010 | Hsu et al. |
| 2010/0023601 A1 | 1/2010 | Lewin et al. |
| 2010/0030662 A1 | 2/2010 | Klein |
| 2010/0030914 A1 | 2/2010 | Sparks et al. |
| 2010/0034470 A1 | 2/2010 | Valencia-Campo et al. |
| 2010/0036944 A1 | 2/2010 | Douglis et al. |
| 2010/0042725 A1 | 2/2010 | Jeon et al. |

(56) References Cited

U.S. PATENT DOCUMENTS

| | | |
|---|---|---|
| 2010/0057894 A1 | 3/2010 | Glasser |
| 2010/0070603 A1 | 3/2010 | Moss et al. |
| 2010/0082787 A1 | 4/2010 | Kommula et al. |
| 2010/0088367 A1 | 4/2010 | Brown et al. |
| 2010/0088405 A1 | 4/2010 | Huang et al. |
| 2010/0100629 A1 | 4/2010 | Raciborski et al. |
| 2010/0111059 A1 | 5/2010 | Bappu et al. |
| 2010/0115133 A1 | 5/2010 | Joshi |
| 2010/0115342 A1 | 5/2010 | Shigeta et al. |
| 2010/0121953 A1 | 5/2010 | Friedman et al. |
| 2010/0121981 A1 | 5/2010 | Drako |
| 2010/0122069 A1 | 5/2010 | Gonion |
| 2010/0125673 A1* | 5/2010 | Richardson et al. .......... 709/239 |
| 2010/0125675 A1* | 5/2010 | Richardson et al. .......... 709/242 |
| 2010/0131646 A1 | 5/2010 | Drako |
| 2010/0138559 A1 | 6/2010 | Sullivan et al. |
| 2010/0150155 A1 | 6/2010 | Napierala |
| 2010/0161799 A1 | 6/2010 | Maloo |
| 2010/0169392 A1 | 7/2010 | Lev Ran et al. |
| 2010/0169452 A1 | 7/2010 | Atluri et al. |
| 2010/0192225 A1 | 7/2010 | Ma et al. |
| 2010/0217801 A1 | 8/2010 | Leighton et al. |
| 2010/0223364 A1 | 9/2010 | Wei |
| 2010/0226372 A1 | 9/2010 | Watanabe |
| 2010/0228819 A1 | 9/2010 | Wei |
| 2010/0257024 A1 | 10/2010 | Holmes et al. |
| 2010/0257266 A1 | 10/2010 | Holmes et al. |
| 2010/0257566 A1 | 10/2010 | Matila |
| 2010/0268789 A1 | 10/2010 | Yoo et al. |
| 2010/0274765 A1 | 10/2010 | Murphy et al. |
| 2010/0281482 A1 | 11/2010 | Pike et al. |
| 2010/0293296 A1 | 11/2010 | Hsu et al. |
| 2010/0293479 A1 | 11/2010 | Rousso et al. |
| 2010/0299427 A1 | 11/2010 | Joshi |
| 2010/0299438 A1 | 11/2010 | Zimmerman et al. |
| 2010/0299439 A1 | 11/2010 | McCarthy et al. |
| 2010/0312861 A1 | 12/2010 | Kolhi et al. |
| 2010/0318508 A1 | 12/2010 | Brawer et al. |
| 2010/0322255 A1 | 12/2010 | Hao et al. |
| 2010/0332595 A1 | 12/2010 | Fullagar et al. |
| 2011/0029598 A1 | 2/2011 | Arnold et al. |
| 2011/0040893 A1 | 2/2011 | Karaoguz et al. |
| 2011/0055714 A1* | 3/2011 | Vemulapalli et al. ......... 715/739 |
| 2011/0078000 A1 | 3/2011 | Ma et al. |
| 2011/0078230 A1 | 3/2011 | Sepulveda |
| 2011/0087769 A1 | 4/2011 | Holmes et al. |
| 2011/0096987 A1 | 4/2011 | Morales et al. |
| 2011/0113467 A1 | 5/2011 | Agarwal et al. |
| 2011/0153938 A1 | 6/2011 | Verzunov et al. |
| 2011/0153941 A1 | 6/2011 | Spatscheck et al. |
| 2011/0154318 A1* | 6/2011 | Oshins et al. .................... 718/1 |
| 2011/0166935 A1 | 7/2011 | Armentrout et al. |
| 2011/0191449 A1 | 8/2011 | Swildens et al. |
| 2011/0191459 A1 | 8/2011 | Joshi |
| 2011/0208876 A1 | 8/2011 | Richardson et al. |
| 2011/0208958 A1 | 8/2011 | Stuedi et al. |
| 2011/0209064 A1* | 8/2011 | Jorgensen et al. ............ 715/733 |
| 2011/0219120 A1 | 9/2011 | Farber et al. |
| 2011/0219372 A1 | 9/2011 | Agrawal et al. |
| 2011/0238501 A1 | 9/2011 | Almeida |
| 2011/0238793 A1 | 9/2011 | Bedare et al. |
| 2011/0239215 A1 | 9/2011 | Sugai |
| 2011/0252142 A1 | 10/2011 | Richardson et al. |
| 2011/0252143 A1 | 10/2011 | Baumback et al. |
| 2011/0258049 A1 | 10/2011 | Ramer et al. |
| 2011/0276623 A1 | 11/2011 | Girbal |
| 2011/0296053 A1 | 12/2011 | Medved et al. |
| 2011/0302304 A1 | 12/2011 | Baumback et al. |
| 2011/0320559 A1 | 12/2011 | Foti |
| 2012/0036238 A1 | 2/2012 | Sundaram et al. |
| 2012/0066360 A1 | 3/2012 | Ghosh |
| 2012/0089972 A1 | 4/2012 | Scheidel et al. |
| 2012/0096065 A1 | 4/2012 | Suit et al. |
| 2012/0124184 A1 | 5/2012 | Sakata et al. |
| 2012/0131177 A1 | 5/2012 | Brandt et al. |
| 2012/0136697 A1 | 5/2012 | Peles et al. |
| 2012/0159476 A1 | 6/2012 | Ramteke et al. |
| 2012/0166516 A1 | 6/2012 | Simmons et al. |
| 2012/0169646 A1 | 7/2012 | Berkes et al. |
| 2012/0173677 A1* | 7/2012 | Richardson et al. .......... 709/219 |
| 2012/0173760 A1 | 7/2012 | Jog et al. |
| 2012/0179817 A1 | 7/2012 | Bade et al. |
| 2012/0179839 A1 | 7/2012 | Raciborski et al. |
| 2012/0198043 A1 | 8/2012 | Hesketh et al. |
| 2012/0233522 A1 | 9/2012 | Barton et al. |
| 2012/0233668 A1 | 9/2012 | Leafe et al. |
| 2012/0303785 A1* | 11/2012 | Sivasubramanian et al. . 709/223 |
| 2012/0303804 A1 | 11/2012 | Sundaram et al. |
| 2012/0311648 A1 | 12/2012 | Swildens et al. |
| 2012/0324089 A1 | 12/2012 | Joshi |
| 2013/0003735 A1 | 1/2013 | Chao et al. |
| 2013/0007100 A1* | 1/2013 | Trahan et al. ................. 709/203 |
| 2013/0007101 A1* | 1/2013 | Trahan et al. ................. 709/203 |
| 2013/0007102 A1* | 1/2013 | Trahan et al. ................. 709/203 |
| 2013/0007241 A1* | 1/2013 | Trahan et al. ................. 709/223 |
| 2013/0019311 A1 | 1/2013 | Swildens et al. |
| 2013/0041872 A1 | 2/2013 | Aizman et al. |
| 2013/0046869 A1* | 2/2013 | Jenkins et al. ................. 709/223 |
| 2013/0054675 A1* | 2/2013 | Jenkins et al. ................. 709/203 |
| 2013/0080420 A1* | 3/2013 | Taylor et al. .................. 707/722 |
| 2013/0080421 A1* | 3/2013 | Taylor et al. .................. 707/722 |
| 2013/0080576 A1* | 3/2013 | Taylor et al. .................. 709/217 |
| 2013/0080577 A1* | 3/2013 | Taylor et al. .................. 709/217 |
| 2013/0086001 A1 | 4/2013 | Bhogal et al. |
| 2013/0117849 A1* | 5/2013 | Golshan et al. ................. 726/23 |
| 2013/0130221 A1 | 5/2013 | Kortemeyer et al. |
| 2013/0151646 A1 | 6/2013 | Chidambaram et al. |
| 2013/0198341 A1 | 8/2013 | Kim |
| 2013/0212300 A1 | 8/2013 | Eggleston et al. |
| 2013/0227165 A1 | 8/2013 | Liu |
| 2013/0246567 A1 | 9/2013 | Green et al. |
| 2013/0268616 A1 | 10/2013 | Sakata et al. |
| 2013/0305046 A1* | 11/2013 | Mankovski et al. .......... 713/168 |
| 2013/0311605 A1 | 11/2013 | Richardson et al. |
| 2013/0318153 A1 | 11/2013 | Sivasubramanian et al. |
| 2013/0339429 A1 | 12/2013 | Richardson et al. |
| 2013/0346567 A1 | 12/2013 | Richardson et al. |
| 2014/0040478 A1 | 2/2014 | Hsu et al. |
| 2014/0053022 A1* | 2/2014 | Forgette et al. ................. 714/21 |
| 2014/0059198 A1 | 2/2014 | Richardson et al. |
| 2014/0059379 A1 | 2/2014 | Ren et al. |
| 2014/0075109 A1 | 3/2014 | Richardson et al. |
| 2014/0089917 A1 | 3/2014 | Attalla et al. |
| 2014/0143320 A1 | 5/2014 | Sivasubramanian et al. |
| 2014/0165061 A1 | 6/2014 | Greene et al. |
| 2014/0257891 A1 | 9/2014 | Richardson et al. |
| 2014/0297870 A1 | 10/2014 | Eggleston et al. |
| 2014/0310811 A1 | 10/2014 | Hentunen |
| 2014/0325155 A1 | 10/2014 | Marshall et al. |
| 2014/0331328 A1 | 11/2014 | Wang et al. |
| 2014/0337472 A1 | 11/2014 | Newton et al. |
| 2014/0365666 A1 | 12/2014 | Richardson et al. |
| 2015/0081842 A1 | 3/2015 | Richardson et al. |
| 2015/0172379 A1 | 6/2015 | Richardson et al. |
| 2015/0172407 A1 | 6/2015 | MacCarthaigh et al. |
| 2015/0172414 A1 | 6/2015 | Richardson et al. |
| 2015/0172415 A1 | 6/2015 | Richardson et al. |
| 2015/0180988 A1 | 6/2015 | Sivasubramanian et al. |
| 2015/0188994 A1 | 7/2015 | Marshall et al. |
| 2015/0195244 A1 | 7/2015 | Richardson et al. |
| 2015/0207733 A1 | 7/2015 | Richardson et al. |
| 2015/0215270 A1 | 7/2015 | Sivasubramanian et al. |
| 2015/0229710 A1 | 8/2015 | Sivasubramanian et al. |

FOREIGN PATENT DOCUMENTS

| | | |
|---|---|---|
| CN | 1605182 A | 4/2005 |
| CN | 101189598 A | 5/2008 |
| CN | 101460907 A | 6/2009 |
| CN | 103731481 A | 4/2014 |
| EP | 1603307 A2 | 12/2005 |
| EP | 1351141 A2 | 10/2007 |
| EP | 2008167 A2 | 12/2008 |
| JP | 2001-0506093 | 5/2001 |

(56) References Cited

FOREIGN PATENT DOCUMENTS

| | | |
|---|---|---|
| JP | 2001-249907 | 9/2001 |
| JP | 2002-044137 | 2/2002 |
| JP | 2003-167810 A | 6/2003 |
| JP | 2003-167813 A | 6/2003 |
| JP | 2003-522358 A | 7/2003 |
| JP | 2003188901 A | 7/2003 |
| JP | 2004-533738 A | 11/2004 |
| JP | 2005-537687 | 12/2005 |
| JP | 2007-133896 A | 5/2007 |
| JP | 2009-071538 A | 4/2009 |
| JP | 2012-509623 | 4/2012 |
| JP | 2012-209623 | 10/2012 |
| WO | WO 02/069608 A2 | 9/2002 |
| WO | WO 2005/071560 A1 | 8/2005 |
| WO | WO 2007/007960 A1 | 1/2007 |
| WO | WO 2007/126837 A3 | 11/2007 |
| WO | WO 2009124006 A2 * | 10/2009 |
| WO | WO 2010/002603 A1 | 1/2010 |
| WO | WO 2012/044587 | 4/2012 |

OTHER PUBLICATIONS

Baglioni et al., "Preprocessing and Mining Web Log Data for Web Personalization", LNAI 2829, 2003, pp. 237-249.
Barbir, A., et al., "Known Content Network (CN) Request-Routing Mechanisms", Request for Comments 3568, [online], IETF, Jul. 2003, [retrieved on Feb. 26, 2013], Retrieved from the Internet: (URL: http://tools.ietf.org/rfc/rfc3568.txt).
Liu et al., "Combined mining of Web server logs and web contents for classifying user navigation patterns and predicting users' future requests," Data & Knowledge Engineering 61 (2007) pp. 304-330.
Tan et al., "Classification: Basic Concepts, Decision Tree, and Model Evaluation", Introduction in Data Mining; http://www-users.cs.umn.edu/~kumar/dmbook/ch4.pdf, 2005, pp. 245-205.
Xu et al., "Decision tree regression for soft classification of remote sensing data", Remote Sensing of Environment 97 (2005) pp. 322-336.
First Office Action is Chinese Application No. 200980125551.8 mailed Jul. 4, 2012.
First Office Action in Japanese Application No. 2011-516466 mailed Mar. 6, 2013.
Office Action in Canadian Application No. 2726915 dated May 13, 2013.
First Office Action in Korean Application No. 10-2011-7002461 mailed May 29, 2013.
First Office Action in Chinese Application No. 200980145872.4 dated Nov. 29, 2012.
Office Action in Canadian Application No. 2741895 dated Feb. 25, 2013.
Office Action in Canadian Application No. 2741895 dated Oct. 21, 2013.
Search Report and Written Opinion in Singapore Application No. 201103333-9 mailed Nov. 19, 2012.
International Search Report and Written Opinion in PCT/US2011/053302 mailed Nov. 28, 2011 in 11 pages.
International Preliminary Report on Patentability in PCT/US2011/053302 mailed Apr. 2, 2013.
International Preliminary Report on Patentability in PCT/US2011/061486 mailed May 22, 2013.
International Search Report and Written Opinion in PCT/US2011/061486 mailed Mar. 30, 2012 in 11 pages.
Preliminary Examination in Chinese Application No. 201180053405.6 dated May 28, 2013 English Translation Not Yet Received.
International Search Report and Written Opinion in PCT/US07/07601 mailed Jul. 18, 2008 in 11 pages.
International Preliminary Report on Patentability in PCT/US2007/007601 mailed Sep. 30, 2008 in 8 pages.
Supplementary European Search Report in Application No. 07754164.7 mailed Dec. 20, 2010 in 7 pages.
Office Action in Chinese Application No. 200780020255.2 dated Mar. 4, 2013.
Office Action in Indian Application No. 3742/KOLNP/2008 dated Nov. 22, 2013.
Office Action in Japanese Application No. 2012-052264 mailed Dec. 11, 2012 in 26 pages.
Deleuze, C., et al., A DNS Based Mapping Peering System for Peering CDNs, draft-deleuze-cdnp-dnsmap-peer-00.txt, Nov. 20, 2000, 20 pages.
First Office Action in Chinese Application No. 200980111422.3 dated Apr. 13, 2012.
First Office Action in Chinese Application No. 200980111426.1 mailed Feb. 16, 2013.
Second Office Action in Chinese Application No. 200980111426.1 mailed Dec. 25, 2013.
First Office Action in Japanese Application No. 2011-502138 dated Feb. 1, 2013.
First Office Action in Japanese Application No. 2011-502139 dated Nov. 5, 2013.
Singapore Examination Report in Application No. 201006837-7 mailed Mar. 16, 2012.
First Singapore Written Opinion in Application No. 201006836-9, dated Oct. 12, 2011 in 12 pages.
Singapore Written Opinion in Application No. 201006837-7, mailed Oct. 12, 2011 in 11 pages.
Supplementary European Search Report in Application No. 09727694.3 mailed Jan. 30, 2012 in 6 pages.
Gunther et al, "Measuring Round Trip Times to determine the Distance between WLAN Nodes",May 2005, In Proc. of Networking 2005, all pages.
Kalafut et al., Understanding Implications of DNS Zone Provisioning., Proceeding IMC '08 Proceedings of the 8th AMC SIGCOMM conference on Internet measurement., pp. 211-216., ACM New York, NY, USA., 2008.
Kato, Yoshinobu , Server load balancer—Difference in distribution technique and supported protocol—Focus on function to meet the needs, Nikkei Communications, Japan, Nikkei Business Publications, Inc., Mar. 20, 2000, vol. 314, pp. 114 to 123 (No English Translation).
Supplementary European Search Report in Application No. 09729072.0 2266064 dated Dec. 10, 2014.
Fourth Office Action in Chinese Application No. 200980111426.1 mailed Jan. 15, 2015.
Decision of Refusal in Japanese Application No. 2011-516466 mailed Jan. 16, 2015.
Office Action in Japanese Application No. 2013-529454 mailed Mar. 9, 2015 in 8 pages.
Examination Report in Singapore Application No. 201301573-0 mailed Dec. 22, 2014.
Office Action in Japanese Application No. 2013-123086 mailed Dec. 2, 2014 in 2 pages.
"Non-Final Office Action dated Jan. 3, 2012," U.S. Appl. No. 12/652,541; Jan. 3, 2012; 35 pages.
"Final Office Action dated Sep. 5, 2012," U.S. Appl. No. 12/652,541; Sep. 5, 2012; 40 pages.
"Notice of Allowance dated Jan. 4, 2013," U.S. Appl. No. 12/652,541; Jan. 4, 2013; 11 pages.
"Non-Final Office Action dated Apr. 30, 2014," U.S. Appl. No. 13/842,970; 20 pages.
"Final Office Action dated Aug. 19, 2014," U.S. Appl. No. 13/842,970; 13 pages.
"Notice of Allowance dated Dec. 5, 2014," U.S. Appl. No. 13/842,970; 6 pages.
Hartung et al.; Digital rights management and watermarking of multimedia content for m-commerce applications; Published in: Communications Magazine, IEEE (vol. 38, Issue: 11 ); Date of Publication: Nov. 2000; pp. 78-84; IEEE Xplore.
Mulligan et al.; How DRM-based content delivery systems disrupt expectations of "personal use"; Published in: Proceeding DRM '03 Proceedings of the 3rd ACM workshop on Digital rights management; 2003; pp. 77-89; ACM Digital Library.
Search Report for European Application No. 09839809.2 dated May 11, 2015.

(56) References Cited

OTHER PUBLICATIONS

First Office Action in Chinese Application No. 201180053405.6 dated May 3, 2015.
"Global Server Load Balancing with ServerIron," Foundry Networks, retrieved Aug. 30, 2007, from http://www.foundrynet.com/pdf/an-global-server-load-bal.pdf, 7 pages.
"Grid Computing Solutions," Sun Microsystems, Inc., retrieved May 3, 2006, from http://www.sun.com/software/grid, 3 pages.
"Grid Offerings," Java.net, retrieved May 3, 2006, from http://wiki.java.net/bin/view/Sungrid/OtherGridOfferings, 8 pages.
"Recent Advances Boost System Virtualization," eWeek.com, retrieved from May 3, 2006, http://www.eWeek.com/article2/0,1895,1772626,00.asp, 5 pages.
"Scaleable Trust of Next Generation Management (STRONGMAN)," retrieved May 17, 2006, from http://www.cis.upenn.edu/~dsl/STRONGMAN/, 4 pages.
"Sun EDA Compute Ranch," Sun Microsystems, Inc., retrieved May 3, 2006, from http://sun.com/processors/ranch/brochure.pdf, 2 pages.
"Sun Microsystems Accelerates UltraSPARC Processor Design Program With New Burlington, Mass. Compute Ranch," Nov. 6, 2002, Sun Microsystems, Inc., retrieved May 3, 2006, from http://www.sun.com/smi/Press/sunflash/2002-11/sunflash.20021106.3 .xml, 2 pages.
"Sun N1 Grid Engine 6," Sun Microsystems, Inc., retrieved May 3, 2006, from http://www.sun.com/software/gridware/index.xml, 3 pages.
"Sun Opens New Processor Design Compute Ranch," Nov. 30, 2001, Sun Microsystems, Inc., retrieved May 3, 2006, from http://www.sun.com/smi/Press/sunflash/2001-11/sunflash.20011130.1.xml, 3 pages.
"The Softricity Desktop," Softricity, Inc., retrieved May 3, 2006, from http://www.softricity.com/products/, 3 pages.
"Xen—The Xen virtual Machine Monitor," University of Cambridge Computer Laboratory, retrieved Nov. 8, 2005, from http://www.cl.cam.ac.uk/Research/SRG/netos/xen/, 2 pages.
"XenFaq," retrieved Nov. 8, 2005, from http://wiki.xensource.com/xenwiki/XenFaq?action=print, 9 pages.
Abi, Issam, et al., "A Business Driven Management Framework for Utility Computing Environments," Oct. 12, 2004, HP Laboratories Bristol, HPL-2004-171, retrieved Aug. 30, 2007, from http://www.hpl.hp.com/techreports/2004/HPL-2004-171.pdf, 14 pages.
Bellovin, S., "Distributed Firewalls," ;login;:37-39, Nov. 1999, http://www.cs.columbia.edu/-smb/papers/distfw. html, 10 pages, retrieved Nov. 11, 2005.
Blaze, M., "Using the KeyNote Trust Management System," Mar. 1, 2001, from http://www.crypto.com/trustmgt/kn.html, 4 pages, retrieved May 17, 2006.
Byun et al., "A Dynamic Grid Services Deployment Mechanism for On-Demand Resource Provisioning", IEEE International Symposium on Cluster Computing and the Grid:863-870, 2005.
Clark, C., "Live Migration of Virtual Machines," May 2005, NSDI '05: 2nd Symposium on Networked Systems Design and Implementation, Boston, MA, May 2-4, 2005, retrieved from http://www.usenix.org/events/nsdi05/tech/full_papers/clark/clark.pdf, 14 pages.
Coulson, D., "Network Security Iptables," Apr. 2003, Linuxpro, Part 2, retrieved from http://davidcoulson.net/writing/lxf/38/iptables.pdf, 4 pages.
Coulson, D., "Network Security Iptables," Mar. 2003, Linuxpro, Part 1, retrieved from http://davidcoulson.net/writing/lxf/39/iptables.pdf, 4 pages.
Demers, A., "Epidemic Algorithms for Replicated Database Maintenance," 1987, Proceedings of the sixth annual ACM Symposium on Principles of Distributed Computing, Vancouver, British Columbia, Canada, Aug. 10-12, 1987, 12 pages.
Gruener, J., "A Vision of Togetherness," May 24, 2004, NetworkWorld, retrieved May 3, 2006, from, http://www.networkworld.com/supp/2004/ndc3/0524virt.html, 9 pages.
Gunther et al, "Measuring Round Trip Times to determine the Distance between WLAN Nodes", Dec. 18, 2004, Technical University Berlin, all pages.
Ioannidis, S., et al., "Implementing a Distributed Firewall," Nov. 2000, (ACM) Proceedings of the ACM Computer and Communications Security (CCS) 2000, Athens, Greece, pp. 190-199, retrieved from http://www.cis.upenn.edu/~dls/STRONGMAN/Papers/df.pdf, 10 pages.
Joseph, Joshy, et al., "Introduction to Grid Computing," Apr. 16, 2004, retrieved Aug. 30, 2007, from http://www.informit.comiarticles/printerfriendly.aspx?p=169508, 19 pages.
Kenshi, P., "Help File Library: Iptables Basics," Justlinux, retrieved Dec. 1, 2005, from http://www.justlinux.com/nhf/Security/Iptables_Basics.html, 4 pages.
Shankland, S., "Sun to buy start-up to bolster N1 ," Jul. 30, 2003, CNet News.com, retrieved May 3, 2006, http://news.zdnet.com/2100-3513_22-5057752.html, 8 pages.
Strand, L., "Adaptive distributed firewall using intrusion detection," Nov. 1, 2004, University of Oslo Department of Informatics, retrieved Mar. 8, 2006, from http://gnist.org/~lars/studies/master/StrandLars-master.pdf, 158 pages.
Van Renesse, R., "Astrolabe: A Robust and Scalable Technology for Distributed System Monitoring, Management, and Data Mining," May 2003, ACM Transactions on Computer Systems (TOCS), 21 (2): 164-206, 43 pages.
Vijayan, J., "Terraspring Gives Sun's N1 a Boost," Nov. 25, 2002, Computerworld, retrieved May 3, 2006, from http://www.computerworld.com/printthis/2002/0,4814, 76159,00.html, 3 pages.
Virtual Iron Software Home, Virtual Iron, retrieved May 3, 2006, from http://www.virtualiron.com/, 1 page.
Waldspurger, CA., "Spawn: A Distributed Computational Economy," Feb. 1992, IEEE Transactions on Software Engineering, 18(2): 103-117, 15 pages.
Zhu, Xiaoyun, et al., "Utility-Driven Workload Management Using Nested Control Design," Mar. 29, 2006, HP Laboratories Palo Alto, HPL-2005-193(R.1), retrieved Aug. 30, 2007, from http://www.hpl.hp.com/techreports/2005/HPL-2005-193R1.pdf, 9 pages.
Singapore Written Opinion in Application No. 201006836-9, dated Apr. 30, 2012 in 10 pages.
Third Office Action in Chinese Application No. 200980111426.1 mailed Jul. 7, 2014.
Decision of Rejection in Application No. 2011-502139 dated Jun. 30, 2014.
Singapore Written Opinion in Application No. 201006874-0, mailed Oct. 12, 2011 in 10 pages.
First Office Action in Japanese Application No. 2011-502140 mailed Dec. 7, 2012.
First Office Action in Chinese Application No. 200980119995.0 dated Jul. 6, 2012.
Second Office Action in Chinese Application No. 200980119995.0 dated Apr. 15, 2013.
Examination Report in Singapore Application No. 201006874-0 dated May 16, 2012.
Supplementary European Search Report in Application No. 09728756.9 mailed Jan. 8, 2013.
First Office Action in Chinese Application No. 200980119993.1 dated Jul. 4, 2012.
Second Office Action in Chinese Application No. 200980119993.1 dated Mar. 12, 2013.
Third Office Action in Chinese Application No. 200980119993.1 dated Oct. 21, 2013.
First Office Action in Japanese Application No. 2011-503091 dated Nov. 18, 2013.
Search Report and Written Opinion issued in Singapore Application No. 201006873-2 mailed on Oct. 12, 2011.
Second Office Action in Japanese Application No. 2011-516466 mailed Mar. 17, 2014.
Preliminary Examination in Chinese Application No. 201310717573.1 dated Feb. 25, 2014 English Translation Not Yet Received.
Examination Report in Singapore Application No. 201103333-9 dated Aug. 13, 2013.

(56) References Cited

OTHER PUBLICATIONS

First Office Action in Japanese Application No. 2013-529454 mailed Feb. 3, 2014 in 6 pages.
First Office Action issued in Australian Application No. 2011307319 mailed Mar. 6, 2014 in 5 pages.
Search Report and Written Opinion in Singapore Application No. 201301573-0 mailed Jul. 1, 2014.
Office Action in Japanese Application No. 2013-540982 dated Jun. 2, 2014 English Translation Not Yet Received.
Written Opinion in Singapore Application No. 201303521-7 dated May 20, 2014.
Office Action in Japanese Application No. 2013-123086 mailed Apr. 15, 2014 in 3 pages.
Canonical Name (CNAME) DNS Records, domainavenue.com, Feb. 1, 2001, XP055153783, Retrieved from the Internet: URL:http://www.domainavenue.com/cname.htm [retrieved on Nov. 18, 2014].
"Content delivery network", Wikipedia, the free encyclopedia, Retrieved from the Internet: URL:http://en.wikipedia.org/w/index.php?title=Contentdelivery network&oldid=601009970, XP055153445, Mar. 24, 2008.
Brenton, C., "What is Egress Filtering and How Can I Implement It?—Egress Filtering v 0.2," Feb. 29, 2000, SANS Institute, http://www.sans.org/infosecFAQ/firewall/egress.htm, 6 pages.
Chipara et al, "Realtime Power-Aware Routing in Sensor Network", IEEE, 2006, 10 pages.
Maesono, et al., "A Local Scheduling Method considering Data Transfer in Data Grid," Technical Report of IEICE, vol. 104, No. 692, pp. 435-440, The Institute of Electronics, Information and Communication Engineers, Japan, Feb. 2005.
Takizawa, et al., "Scalable MultiReplication Framework on the Grid," Report of Study of Information Processing Society of Japan, Information Processing Society, vol. 2004, No. 81, pp. 247-252, Japan, Aug. 1, 2004.
Watanabe, et al., "Remote Program Shipping System for GridRPC Systems," Report of Study of Information Processing Society of Japan, Information Processing Society, vol. 2003, No. 102, pp. 73-78, Japan, Oct. 16, 2003.
Yamagata, et al., "A virtual-machine based fast deployment tool for Grid execution environment," Report of Study of Information Processing Society of Japan, Information Processing Society, vol. 2006, No. 20, pp. 127-132, Japan, Feb. 28, 2006.
First Office Action in Chinese Application No. 201180046104.0 mailed Nov. 3, 2014.
Armour et al.: "A Heuristic Algorithm and Simulation Approach to Relative Location of Facilities"; Management Science, vol. 9, No. 2 (Jan. 1963); pp. 294-309.
Meng et al., "Improving the Scalability of Data Center Networks with Traffic-Aware Virtual Machine Placement"; Proceedings of the 29th Conference on Information Communications, INFOCOM'10, pp. 1154-1162. Piscataway, NJ. IEEE Press, 2010.
Fifth Office Action in Chinese Application No. 200980111426.1 mailed Aug. 14, 2015.
Office Action issued in connection with U.S. Appl. No. 12/059,997 mailed on Jun. 9, 2010.
Final Office Action issued in connection with U.S. Appl. No. 12/059,997 mailed on Jan. 7, 2011.
Office Action issued in connection with U.S. Appl. No. 13/419,233 mailed on Jan. 9, 2014.
Final Office Action issued in connection with U.S. Appl. No. 13/419,233 mailed on Aug. 19, 2014.
Office Action issued in connection with U.S. Appl. No. 13/419,233 mailed on Jan. 2, 2015.
Final Office Action issued in connection with U.S. Appl. No. 13/419,233, mailed on Apr. 24, 2015.
Office Action issued in connection with U.S. Appl. No. 13/419,233 mailed on Aug. 28, 2015.
Office Action issued in connection with U.S. Appl. No. 12/060,013 mailed on Dec. 1, 2009.
Final Office Action issued in connection with U.S. Appl. No. 12/060,013 mailed on Aug. 23, 2010.
Notice of Allowance issued in connection with U.S. Appl. No. 12/060,013 mailed on Aug. 13, 2013.
Notice of Allowance issued in connection with U.S. Appl. No. 14/066,516 mailed on Aug. 25, 2014.
Office Action issued in connection with U.S. Appl. No. 14/548,221 mailed on Jun. 16, 2015.
Office Action issued in connection with U.S. Appl. No. 12/060,015 mailed on Nov. 3, 2010.
Final Office Action issued in connection with U.S. Appl. No. 12/060,015 mailed on Mar. 31, 2011.
Office Action issued in connection with U.S. Appl. No. 12/060,015 mailed on Apr. 11, 2013.
Notice of Allowance issued in connection with U.S. Appl. No. 12/060,015 mailed on Aug. 9, 2013.
Office issued in connection with U.S. Appl. No. 14/078,274 on May 5, 2015.
Notice of Allowance issued in connection with U.S. Appl. No. 14/078,274 mailed on Aug. 21, 2015.
Office Action issued in connection with U.S. Appl. No. 12/060,143 mailed on Jun. 24, 2010.
Final Office Action issued in connection with U.S. Appl. No. 12/060,143 mailed on Feb. 4, 2011.
Office Action issued in connection with U.S. Appl. No. 12/060,143 mailed on Jul. 20, 2012.
Notice of Allowance issued in connection with U.S. Appl. No. 12/060,143 mailed on Jan. 25, 2013.
Office Action issued in connection with U.S. Appl. No. 13/897,027 mailed on Aug. 20, 2014.
Notice of Allowance issued in connection with U.S. Appl. No. 13/897,027 mailed on Jan. 22, 2015.
Office Action issued in connection with U.S. Appl. No. 12/060,124 mailed on Jul. 12, 2010.
Notice of Allowance issued in connection with U.S. Appl. No. 12/060,124 mailed on Feb. 23, 2011.
Notice of Allowance issued in connection with U.S. Appl. No. 13/296,189 mailed on May 11, 2012.
Notice of Allowance issued in connection with U.S. Appl. No. 13/614,714 mailed on Jan. 10, 2013.
Office Action issued in connection with U.S. Appl. No. 13/888,283 mailed on Mar. 18, 2014.
Office Action issued in connection with U.S. Appl. No. 13/888,283 mailed on Sep. 15, 2014.
Notice of Allowance issued in connection with U.S. Appl. No. 13/888,283 mailed on Dec. 17, 2014.
Office Action issued in connection with U.S. Appl. No. 14/639,933 mailed on Aug. 17, 2015.
Office Action issued in connection with U.S. Appl. No. 12/060,173 mailed on Jul. 8, 2010.
Notice of Allowance issued in connection with U.S. Appl. No. 12/060,173 mailed on Feb. 1, 2011.
Notice of Allowance issued in connection with U.S. Appl. No. 13/098,366 mailed on Nov. 7, 2011.
Notice of Allowance issued in connection with U.S. Appl. No. 13/418,239 mailed on Oct. 16, 2012.
Notice of Allowance issued in connection with U.S. Appl. No. 13/766,574 mailed on Dec. 23, 2013.
Office Action issued in connection with U.S. Appl. No. 12/060,202 mailed on May 13, 2010.
Final Office Action issued in connection with U.S. Appl. No. 12/060,202 mailed on Nov. 9, 2010.
Office Action issued in connection with U.S. Appl. No. 12/060,202 mailed on Jan. 19, 2012.
Final Office Action issued in connection with U.S. Appl. No. 12/060,202 mailed on Jun. 28, 2012.
Notice of Allowance issued in connection with U.S. Appl. No. 12/060,202 mailed on Jun. 7, 2013.
Office Action issued in connection with U.S. Appl. No. 14/012,387 mailed on Jan. 5, 2015.
Final Office Action issued in connection with U.S. Appl. No. 14/012,387 mailed on Jun. 8, 2015.
Notice of Allowance issued in connection with U.S. Appl. No. 14/012,387 mailed on Aug. 14, 2015.

(56) References Cited

OTHER PUBLICATIONS

Office Action issued in connection with U.S. Appl. No. 12/060,213 mailed on Jun. 17, 2010.
Final Office Action issued in connection with U.S. Appl. No. 12/060,213 mailed on Nov. 10, 2010.
Office Action issued in connection with U.S. Appl. No. 12/060,213 mailed on Mar. 22, 2012.
Notice of Allowance issued in connection with U.S. Appl. No. 13/720,955 mailed on Sep. 10, 2013.
Notice of Allowance issued in connection with U.S. Appl. No. 13/793,886 mailed on Feb. 19, 2014.
Office Action issued in connection with U.S. Appl. No. 13/621,084 mailed on May 30, 2014.
Final Office Action issued in connection with U.S. Appl. No. 13/621,084 mailed on Oct. 23, 2014.
Office Action issued in connection with U.S. Appl. No. 13/621,084 mailed on Feb. 11, 2015.
Final Office Action issued in connection with U.S. Appl. No. 13/621,084 mailed on Jun. 16, 2015.
Office Action issued in connection with U.S. Appl. No. 13/621,085 mailed on May 15, 2014.
Final Office Action issued in connection with U.S. Appl. No. 13/621,085 mailed on Oct. 23, 2014.
Office Action issued in connection with U.S. Appl. No. 13/621,085 mailed on Mar. 26, 2015.
Final Office Action issued in connection with U.S. Appl. No. 13/621,085 mailed on Jul. 10, 2015.
Office Action issued in connection with U.S. Appl. No. 12/189,019 mailed on Feb. 8, 2011.
Final Office Action issued in connection with U.S. Appl. No. 12/189,019 mailed on Aug. 19, 2011.
Notice of Allowance issued in connection with U.S. Appl. No. 12/189,019 mailed on Nov. 5, 2012.
Office Action issued in connection with U.S. Appl. No. 12/956,823 mailed on Aug. 5, 2011.
Final Office Action issued in connection with U.S. Appl. No. 12/956,823 mailed on Jan. 6, 2012.
Office Action issued in connection with U.S. Appl. No. 12/956,647 mailed on Aug. 5, 2011.
Office Action issued in connection with U.S. Appl. No. 12/956,647 mailed on Jan. 13, 2012.
Notice of Allowance issued in connection with U.S. Appl. No. 12/956,647 mailed on Nov. 9, 2012.
Office Action issued in connection with U.S. Appl. No. 12/956,748 mailed on Jun. 23, 2011.
Final Office Action issued in connection with U.S. Appl. No. 12/956,748 mailed on Nov. 10, 2011.
Notice of Allowance issued in connection with U.S. Appl. No. 12/956,748 mailed on Nov. 6, 2012.
Office Action issued in connection with U.S. Appl. No. 12/596,566 mailed on Jul. 8, 2011.
Final Office Action issued in connection with U.S. Appl. No. 12/596,566 mailed on Jan. 5, 2012.
Office Action issued in connection with U.S. Appl. No. 12/165,343 mailed on Mar. 22, 2010.
Office Action issued in connection with U.S. Appl. No. 13/568,005 mailed on Nov. 5, 2012.
Office Action issued in connection with U.S. Appl. No. 13/896,840 mailed on Sep. 23, 2014.
Notice of Allowance issued in connection with U.S. Appl. No. 13/896,840 mailed on Jan. 5, 2015.
Office Action issued in connection with U.S. Appl. No. 13/042,301 mailed on Aug. 24, 2011.
Office Action issued in connection with U.S. Appl. No. 12/412,456 mailed on May 16, 2011.
Final Office Action issued in connection with U.S. Appl. No. 12/412,456 mailed on Mar. 12, 2012.
Notice of Allowance issued in connection with U.S. Appl. No. 12/412,456 mailed on Feb. 12, 2014.
Office Action issued in connection with U.S. Appl. No. 13/909,882 mailed on Aug. 21, 2014.
Final Office Action issued in connection with U.S. Appl. No. 13/909,882 mailed on Jan. 14, 2015.
Notice of Allowance issued in connection with U.S. Appl. No. 13/909,882 mailed on Mar. 24, 2015.
Office Action issued in connection with U.S. Appl. No. 14/010,438 mailed on Sep. 11, 2014.
Notice of Allowance issued in connection with U.S. Appl. No. 14/010,438 mailed on Dec. 11, 2014.
Office Action issued in connection with U.S. Appl. No. 14/297,558 mailed on Sep. 30, 2014.
Final Office Action issued in connection with U.S. Appl. No. 14/297,558 mailed on Apr. 7, 2015.
Notice of Allowance issued in connection with U.S. Appl. No. 14/297,558 mailed on Jul. 21, 2015.
Office Action issued in connection with U.S. Appl. No. 13/621,062 mailed on Dec. 5, 2012.
Notice of Allowance issued in connection with U.S. Appl. No. 13/621,062 mailed on Feb. 22, 2013.
Office Action issued in connection with U.S. Appl. No. 13/621,066 mailed on Feb. 14, 2013.
Notice of Allowance issued in connection with U.S. Appl. No. 13/621,066 mailed on May 8, 2013.
Office Action issued in connection with U.S. Appl. No. 12/412,467 mailed on May 22, 2013.
Notice of Allowance issued in connection with U.S. Appl. No. 12/412,467 mailed on Nov. 8, 2013.
Office Action issued in connection with U.S. Appl. No. 12/485,783 mailed on Aug. 30, 2012.
Office Action issued in connection with U.S. Appl. No. 12/485,783 mailed on Mar. 26, 2013.
Final Office Action issued in connection with U.S. Appl. No. 12/485,783 mailed on Oct. 7, 2013.
Notice of Allowance issued in connection with U.S. Appl. No. 12/485,783 mailed on Mar. 31, 2014.
Office Action issued in connection with U.S. Appl. No. 14/331,067 mailed on Nov. 26, 2014.
Final Office Action issued in connection with U.S. Appl. No. 14/331,067 mailed on Apr. 27, 2015.
Notice of Allowance issued in connection with U.S. Appl. No. 14/331,067 mailed on Jul. 7, 2015.
Office Action issued in connection with U.S. Appl. No. 13/620,868 mailed on Nov. 23, 2012.
Office Action issued in connection with U.S. Appl. No. 12/412,431 mailed on Mar. 8, 2012.
Office Action issued in connection with U.S. Appl. No. 12,412,431 mailed on Nov. 23, 2012.
Notice of Allowance issued in connection with U.S. Appl. No. 12,412,431 mailed on May 10, 2013.
Office Action issued in connection with U.S. Appl. No. 12/272,681 mailed on Nov. 26, 2010.
Final Office Action issued in connection with U.S. Appl. No. 12/272,681 mailed on Apr. 27, 2011.
Office Action issued in connection with U.S. Appl. No. 12/272,681 mailed on Oct. 11, 2012.
Notice of Allowance issued in connection with U.S. Appl. No. 12/272,681 mailed on Apr. 18, 2013.
Office Action issued in connection with U.S. Appl. No. 14/010,461 mailed on May 2, 2014.
Final Office Action issued in connection with U.S. Appl. No. 14/010,461 mailed on Oct. 9, 2014.
Office Action issued in connection with U.S. Appl. No. 14/010,461 mailed on Jan. 15, 2015.
Final Office Action issued in connection with U.S. Appl. No. 14/010,461 mailed on Jul. 9, 2015.
Office Action issued in connection with U.S. Appl. No. 12/272,666 mailed on Feb. 23, 2011.
Notice of Allowance issued in connection with U.S. Appl. No. 12/272,666 mailed on Aug. 25, 2011.
Notice of Allowance issued in connection with U.S. Appl. No. 13/296,156 mailed on Jun. 8, 2012.

(56) References Cited

OTHER PUBLICATIONS

Notice of Allowance issued in connection with U.S. Appl. No. 13/620,945 mailed on May 1, 2013.
Office Action issued in connection with U.S. Appl. No. 12/412,443 mailed on Mar. 15, 2012.
Notice of Allowance issued in connection with U.S. Appl. No. 12/412,443 mailed on Nov. 27, 2012.
Office Action issued in connection with U.S. Appl. No. 13/829,586 mailed on May 28, 2015.
Office Action issued in connection with U.S. Appl. No. 12/272,687 mailed on Sep. 9, 2010.
Office Action issued in connection with U.S. Appl. No. 12/272,687 mailed on Feb. 3, 2011.
Notice of Allowance issued in connection with U.S. Appl. No. 12/272,687 mailed on May 27, 2011.
Notice of Allowance issued in connection with U.S. Appl. No. 12/272,687 mailed on Aug. 17, 2012.
Office Action issued in connection with U.S. Appl. No. 13/908,830 mailed on Sep. 23, 2014.
Notice of Allowance issued in connection with U.S. Appl. No. 13/908,830 mailed on Dec. 15, 2014.
Office Action issued in connection with U.S. Appl. No. 12/272,655 mailed on Mar. 4, 2011.
Final Office Action issued in connection with U.S. Appl. No. 12/272,655 mailed on Oct. 28, 2011.
Notice of Allowance issued in connection with U.S. Appl. No. 12/272,655 mailed on Jan. 16, 2014.
Office Action issued in connection with U.S. Appl. No. 14/281,165 mailed on Aug. 5, 2015.
Office Action issued in connection with U.S. Appl. No. 12/272,699 mailed on Dec. 14, 2010.
Office Action issued in connection with U.S. Appl. No. 13/299,169 mailed on Feb. 3, 2012.
Notice of Allowance issued in connection with U.S. Appl. No. 13/299,169 mailed on Mar. 27, 2012.
Office Action issued in connection with U.S. Appl. No. 13/567,429 mailed on Nov. 16, 2012.
Notice of Allowance issued in connection with U.S. Appl. No. 13/567,429 mailed on Jul. 25, 2013.
Office Action issued in connection with U.S. Appl. No. 14/062,614 mailed on Jul. 6, 2015.
Office Action issued in connection with U.S. Appl. No. 12/272,683 mailed on Sep. 9, 2010.
Final Office Action issued in connection with U.S. Appl. No. 12/272,683 mailed on Jan. 14, 2011.
Notice of Allowance issued in connection with U.S. Appl. No. 13/165,484 mailed on Mar. 22, 2012.
Notice of Allowance issued in connection with U.S. Appl. No. 13/529,831 mailed on Dec. 13, 2012.
Office Action issued in connection with U.S. Appl. No. 13/829,518 mailed on Sep. 19, 2014.
Notice of Allowance issued in connection with U.S. Appl. No. 13/829,518 mailed on Jan. 15, 2015.
Office Action issued in connection with U.S. Appl. No. 12/272,715 mailed on Jan. 24, 2011.
Final Office Action issued in connection with U.S. Appl. No. 12/272,715 mailed on Jun. 28, 2011.
Notice of Allowance issued in connection with U.S. Appl. No. 12/272,715 mailed on Oct. 21, 2011.
Office Action issued in connection with U.S. Appl. No. 13/358,478 mailed on Apr. 26, 2012.
Final Office Action issued in connection with U.S. Appl. No. 13/358,478 mailed on Oct. 12, 2012.
Notice of Allowance issued in connection with U.S. Appl. No. 13/358,478 mailed on Apr. 2, 2014.
Office Action issued in connection with U.S. Appl. No. 12/272,641 mailed on Feb. 23, 2011.
Notice of Allowance issued in connection with U.S. Appl. No. 12/272,641 mailed on Aug. 25, 2011.
Notice of Allowance issued in connection with U.S. Appl. No. 13/299,229 mailed on Jun. 6, 2012.
Notice of Allowance issued in connection with U.S. Appl. No. 13/614,971 mailed on May 31, 2013.
Office Action issued in connection with U.S. Appl. No. 12/722,454 mailed on May 31, 2012.
Notice of Allowance issued in connection with U.S. Appl. No. 12/722,454 mailed on Nov. 26, 2012.
Notice of Allowance issued in connection with U.S. Appl. No. 13/794,415 mailed on Apr. 14, 2015.
Office Action issued in connection with U.S. Appl. No. 12/892,777 mailed on Mar. 22, 2013.
Final Office Action issued in connection with U.S. Appl. No. 12/892,777 mailed on Jan. 30, 2014.
Office Action issued in connection with U.S. Appl. No. 12/892,777 mailed on Mar. 25, 2015.
Office Action issued in connection with U.S. Appl. No. 12/892,794 mailed on Jul. 23, 2012.
Final Office Action issued in connection with U.S. Appl. No. 12/892,764 mailed on Feb. 15, 2013.
Office Action issued in connection with U.S. Appl. No. 12/892,794 mailed on Jul. 24, 2014.
Final Office Action issued in connection with U.S. Appl. No. 12/892,794 mailed on Feb. 13, 2015.
Office Action issued in connection with U.S. Appl. No. 12/892,794 mailed on Sep. 18, 2015.
Office Action issued in connection with U.S. Appl. No. 12/892,822 mailed on Oct. 11, 2012.
Notice of Allowance issued in connection with U.S. Appl. No. 12/892,822 mailed on Mar. 4, 2013.
Office Action issued in connection with U.S. Appl. No. 13/919,912 mailed on Feb. 20, 2015.
Final Office Action issued in connection with U.S. Appl. No. 13/919,912 mailed on Jul. 22, 2015.
Office Action issued in connection with U.S. Appl. No. 13/620,976 mailed on Jan. 10, 2013.
Final Office Action issued in connection with U.S. Appl. No. 13/620,976 mailed on Aug. 13, 2013.
Office Action issued in connection with U.S. Appl. No. 12/892,818 mailed on Oct. 22, 2012.
Final Office Action issued in connection with U.S. Appl. No. 12/892,818 mailed on Feb. 13, 2013.
Office Action issued in connection with U.S. Appl. No. 12/892,818 mailed on Apr. 11, 2014.
Final Office Action issued in connection with U.S. Appl. No. 12/892,818 mailed on Oct. 10, 2014.
Notice of Allowance issued in connection with U.S. Appl. No. 12/892,818 mailed on Dec. 19, 2014.
Office Action issued in connection with U.S. Appl. No. 14/629,411 mailed on Sep. 1, 2015.
Office Action issued in connection with U.S. Appl. No. 13/621,010 mailed on Jan. 10, 2013.
Final Office Action issued in connection with U.S. Appl. No. 13/621,010 mailed on May 21, 2013.
Office Action issued in connection with U.S. Appl. No. 13/621,010 mailed on Apr. 8, 2014.
Final Office Action issued in connection with U.S. Appl. No. 13/621,010 mailed on Oct. 10, 2014.
Office Action issued in connection with U.S. Appl. No. 13/621,010 mailed on Feb. 5, 2015.
Final Office Action issued in connection with U.S. Appl. No. 13/621,010 mailed on Jul. 10, 2015.
Office Action issued in connection with U.S. Appl. No. 12/892,819 mailed on Oct. 11, 2012.
Final Office Action issued in connection with U.S. Appl. No. 12/892,819 mailed on Feb. 15, 2013.
Office Action issued in connection with U.S. Appl. No. 12/892,819 mailed on Apr. 15, 2014.
Final Office Action issued in connection with U.S. Appl. No. 12/892,819 mailed on Oct. 28, 2014.
Office Action issued in connection with U.S. Appl. No. 12/892,819 mailed on Feb. 18, 2015.

(56) References Cited

OTHER PUBLICATIONS

Final Office Action issued in connection with U.S. Appl. No. 12/892,819 mailed on Jul. 24, 2015.
Office Action issued in connection with U.S. Appl. No. 13/620,979 mailed on Jan. 16, 2013.
Final Office Action issued in connection with U.S. Appl. No. 13/620,979 mailed on May 28, 2013.
Office Action issued in connection with U.S. Appl. No. 13/620,979 mailed on Feb. 11, 2014.
Final Office Action issued in connection with U.S. Appl. No. 13/620,979 mailed on Jul. 15, 2014.
Office Action issued in connection with U.S. Appl. No. 13/620,979 mailed on Nov. 13, 2014.
Final Office Action issued in connection with U.S. Appl. No. 13/620,979 mailed on Feb. 23, 2015.
Office Action issued in connection with U.S. Appl. No. 12/892,852 mailed on Oct. 11, 2012.
Office Action issued in connection with U.S. Appl. No. 12/892,852 mailed on Feb. 24, 2014.
Final Office Action issued in connection with U.S. Appl. No. 12/892,852 mailed on Aug. 8, 2014.
Office Action issued in connection with U.S. Appl. No. 12/892,852 mailed on Dec. 1, 2014.
Final Office Action issued in connection with U.S. Appl. No. 12/892,852 mailed on Mar. 20, 2015.
Office Action issued in connection with U.S. Appl. No. 13/621,022 mailed on Jan. 2, 2013.
Final Office Action issued in connection with U.S. Appl. No. 13/621,022 mailed on May 22, 2013.
Office Action issued in connection with U.S. Appl. No. 13/621,022 mailed on Feb. 12, 2014.
Final Office Action issued in connection with U.S. Appl. No. 13/621,022 mailed on Jul. 17, 2014.
Office Action issued in connection with U.S. Appl. No. 13/621,022 mailed on Nov. 14, 2014.
Final Office Action issued in connection with U.S. Appl. No. 13/621,022 mailed on Feb. 23, 2015.
Office Action issued in connection with U.S. Appl. No. 12/892,873 mailed on Aug. 21, 2012.
Final Office Action issued in connection with U.S. Appl. No. 12/892,873 mailed on Jan. 7, 2013.
Office Action issued in connection with U.S. Appl. No. 12/892,873 mailed on May 7, 2014.
Notice of Allowance issued in connection with U.S. Appl. No. 12/892,873 mailed on Sep. 12, 2014.
Office Action issued in connection with U.S. Appl. No. 14/550,889 mailed on Mar. 12, 2015.
Notice of Allowance issued in connection with U.S. Appl. No. 14/550,889 mailed on Jul. 17, 2015.
Office Action issued in connection with U.S. Appl. No. 12/892,861 mailed on Aug. 21, 2012.
Final Office Action issued in connection with U.S. Appl. No. 12/892,861 mailed on Jan. 4, 2013.
Office Action issued in connection with U.S. Appl. No. 12/892,681 mailed on May 7, 2014.
Notice of Allowance issued in connection with U.S. Appl. No. 12/892,681 mailed on Aug. 29, 2014.
Office Action issued in connection with U.S. Appl. No. 14/550,892 mailed on Apr. 27, 2015.
Final Office Action issued in connection with U.S. Appl. No. 14/550,892 mailed on Aug. 17, 2015.
Office Action issued in connection with U.S. Appl. No. 12/892,889 mailed on May 1, 2013.
Final Office Action issued in connection with U.S. Appl. No. 12/892,889 mailed on Oct. 10, 2012.
Notice of Allowance issued in connection with U.S. Appl. No. 12/892,889 mailed on Oct. 3, 2014.
Notice of Allowance issued in connection with U.S. Appl. No. 14/566,615 mailed on Jun. 19, 2015.
Office Action issued in connection with U.S. Appl. No. 12/892,880 mailed on Sep. 20, 2012.
Final Office Action issued in connection with U.S. Appl. No. 12/892,880 mailed on Apr. 5, 2013.
Office Action issued in connection with U.S. Appl. No. 14/071,276 mailed on Aug. 25, 2014.
Final Office Action issued in connection with U.S. Appl. No. 14/071,276 mailed on Feb. 4, 2015.
Notice of Allowance issued in connection with U.S. Appl. No. 14/071,276 mailed on Apr. 2, 2015.
Office Action issued in connection with U.S. Appl. No. 12/892,877 mailed on Nov. 6, 2012.
Final Office Action issued in connection with U.S. Appl. No. 12/892,877 mailed on Mar. 19, 2013.
Notice of Allowance issued in connection with U.S. Appl. No. 12/892,877 mailed on Jun. 2, 2014.
Ofice Action issued in connection with U.S. Appl. No. 14/467,774 mailed on Mar. 27, 2015.
Notice of Allowance issued in connection with U.S. Appl. No. 14/467,774 mailed on Jul. 23, 2015.
Office Action issued in connection with U.S. Appl. No. 12/695,537 mailed on Mar. 30, 2012.
Final Office Action issued in connection with U.S. Appl. No. 12/695,537 mailed on Oct. 15, 2012.
Office Action issued in connection with U.S. Appl. No. 12/695,537 mailed on Jul. 8, 2014.
Office Action issued in connection with U.S. Appl. No. 12/695,537 mailed on Jan. 29, 2015.
Final Office Action issued in connection with U.S. Appl. No. 12/695,537 mailed on Aug. 14, 2015.
Notice of Allowance issued in connection with U.S. Appl. No. 12/952,118 mailed on Feb. 4, 2013.
Office Action issued in connection with U.S. Appl. No. 13/873,040 mailed on Jul. 18, 2014.
Notice of Allowance issued in connection with U.S. Appl. No. 13/873,040 mailed on Dec. 1, 2014.
Office Action issued in connection with U.S. Appl. No. 12/960,421 mailed on May 10, 2013.
Office Action issued in connection with U.S. Appl. No. 12/960,402 mailed on Jun. 20, 2013.
Final Office Action issued in connection with U.S. Appl. No. 12/960,402 mailed on May 8, 2014.
Office Action issued in connection with U.S. Appl. No. 12/960,402 mailed on Oct. 23, 2014.
Final Office Action issued in connection with U.S. Appl. No. 12/960,402 mailed on May 19, 2015.
Office Action issued in connection with U.S. Appl. No. 11/771,679 mailed on Apr. 30, 2010.
Final Office Action issued in connection with U.S. Appl. No. 11/771,679 mailed on Sep. 1, 2010.
Office Action issued in connection with U.S. Appl. No. 13/401,715 mailed on Jun. 26, 2013.
Final Office Action issued in connection with U.S. Appl. No. 13/401,715 mailed on Jan. 14, 2014.
Office Action issued in connection with U.S. Appl. No. 13/401,715 mailed on Jul. 18, 2014.
Final Office Action issued in connection with U.S. Appl. No. 13/401,715 mailed on Feb. 27, 2015.
Office Action issued in connection with U.S. Appl. No. 13/401,715 mailed on Jul. 8, 2015.
Office Action issued in connection with U.S. Appl. No. 13/493,839 mailed on Jan. 14, 2014.
Office Action issued in connection with U.S. Appl. No. 13/493,839 mailed on Jan. 15, 2015.
Notice of Allowance issued in connection with U.S. Appl. No. 13/493,839 mailed on May 8, 2015.
Final Office Action issued in connection with U.S. Appl. No. 13/528,664 mailed on Mar. 26, 2015.
Office Action issued in connection with U.S. Appl. No. 13/603,369 mailed on Jan. 22, 2015.
Office Action issued in connection with U.S. Appl. No. 13/603,369 mailed on Jun. 11, 2015.

(56) References Cited

OTHER PUBLICATIONS

Office Action issued in connection with U.S. Appl. No. 11/395,463 mailed on Nov. 13, 2009.
Final Office Action issued in connection with U.S. Appl. No. 11/395,463 mailed on Dec. 29, 2010.
Office Action issued in connection with U.S. Appl. No. 11/395,463 mailed on Jul. 19, 2011.
Office Action issued in connection with U.S. Appl. No. 13/095,554 mailed on Sep. 4, 2012.
Final Office Action issued in connection with U.S. Appl. No. 13/095,554 mailed Jun. 20, 2013.
Office Action issued in connection with U.S. Appl. No. 13/095,554 mailed on Oct. 7, 2014.
Final Office Action issued in connection with U.S. Appl. No. 13/095,554 mailed on Jun. 30, 2015.
Office Action issued in connection with U.S. Appl. No. 12/652,541 mailed on Jan. 3, 2012.
Final Office Action issued in connection with U.S. Appl. No. 12/652,541 mailed on Sep. 5, 2012.
Notice of Allowance issued in connection with U.S. Appl. No. 12/652,541 mailed on Jan. 4, 2013.
Office Action issued in connection with U.S. Appl. No. 13/842,970 mailed on Apr. 30, 2014.
Final Office Action issued in connection with U.S. Appl. No. 13/842,970 mailed on Aug. 19, 2014.

* cited by examiner

MANAGING NETWORK COMPUTING COMPONENTS UTILIZING REQUEST ROUTING

BACKGROUND

Generally described, computing devices and communication networks can be utilized to exchange information. In a common application, a computing device can request content from another computing device via a communication network. For example, a user at a personal computing device can utilize various types of software applications to request information from server computing devices via the Internet. In such embodiments, the user computing device can be referred to as a client computing device and the server computing device can be referred to as a service provider.

In some embodiments, companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

In some embodiments, a client computing device may access software applications that may be provided by communication with a data center. For example, a service provider may host, or have hosted on its behalf, one or more physical computing devices in a data center that provide client computing devices with access to software application via a communication network. Additionally, the service provider can also utilize virtualization technologies to provide access to the software application. For example, the service provider can instantiate and maintain a number of virtual machine instances on the physical computing devices associated with a data center.

Service providers are generally motivated to provide requested content/services or access to requested content/services to client computing devices often with consideration of cost and customer experience. For example, service providers can associate a cost associated with providing the client computing device with access to content/service and manage instantiated virtual machine instances on the basis of cost or available resources.

DETAILED DESCRIPTION

Generally described, the present disclosure is directed to processing DNS queries from client computing devices. Specifically, aspects of the disclosure will be described with regard to the processing of a client computing device DNS queries by a DNS processing service in which the DNS query includes an identifier associated with a previously instantiated hosted virtual machine instance. In one aspect, if the previously instantiated hosted virtual machine instance is instantiated and available to process requests, the DNS service can resolve the DNS query by transmitting network address information, or an alternative identifier, associated with the previously instantiated hosted virtual machine instance. In another aspect, if the previously instantiated hosted virtual machine instance is not instantiated and otherwise not available to process requests, the DNS service can initiate a process to cause an instantiation of a hosted virtual machine instance based on the previously instantiated hosted virtual machine instance. The DNS service can then resolve the DNS query by transmitting network address information, or an alternative identifier, associated with the newly instantiated hosted virtual machine instance.

Figure 1:
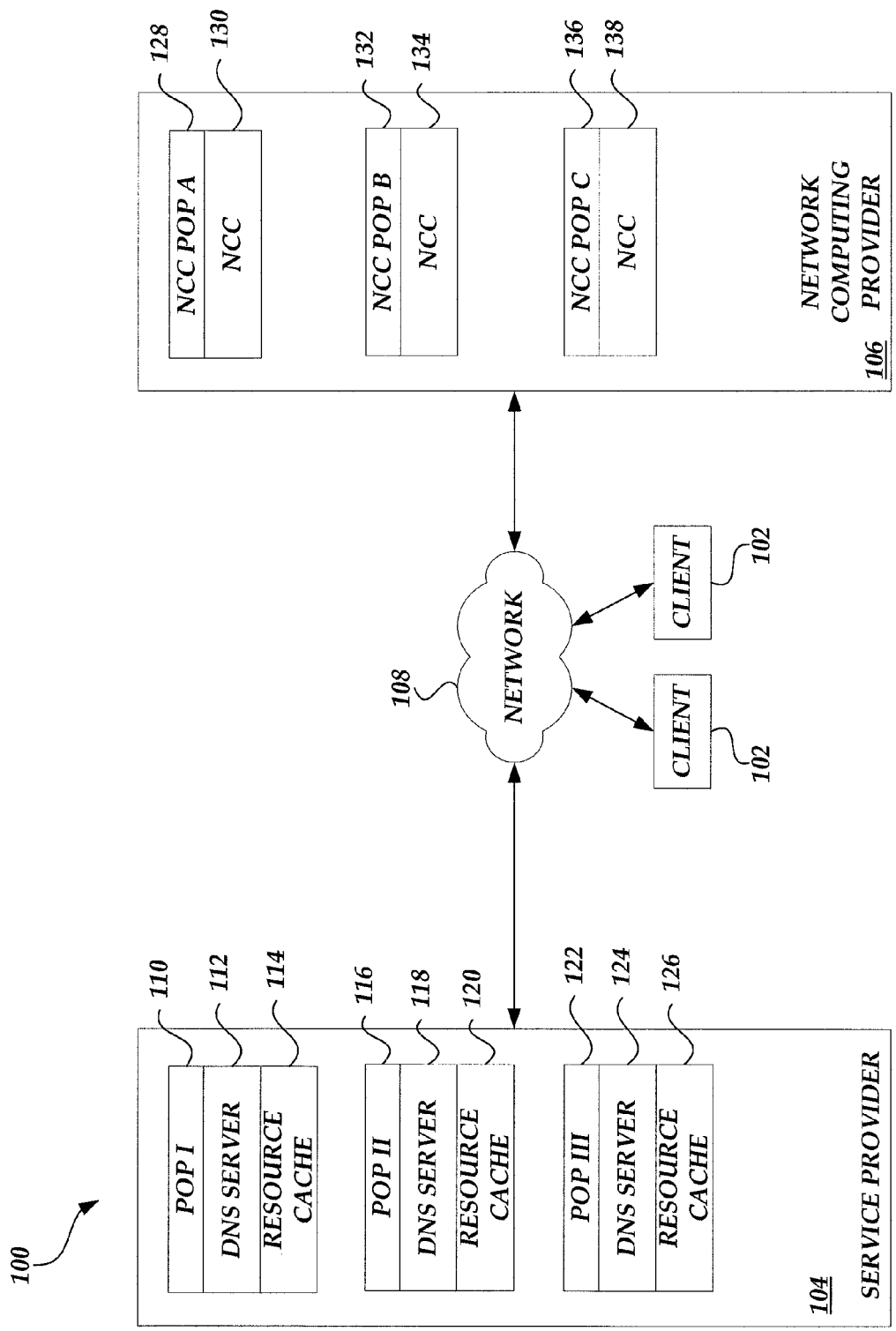
FIG. 1 is a block diagram illustrative of an environment for the management and processing of DNS queries related to hosted virtual machine instances.

FIG. 1 is a block diagram illustrative of an environment 100 for the management and processing of DNS queries related to hosted virtual machine instances. As illustrated in FIG. 1, the environment 100 includes a number of client computing devices 102 (generally referred to as clients) for transmitting requests to a service provider. In an illustrative embodiment, the client computing devices 102 can corresponds to a wide variety of computing devices including personal computing devices, laptop computing devices, hand-held computing devices, terminal computing devices, mobile devices, wireless devices, various electronic devices and appliances and the like. In an illustrative embodiment, the client computing devices 102 include necessary hardware and software components for establishing communications over a communication network 108, such as a wide area network or local area network. For example, the client computing devices 102 may be equipped with networking equipment and browser software applications that facilitate communications via the Internet or an intranet.

Although not illustrated in FIG. 1, each client computing device 102 utilizes some type of local DNS resolver component, such as a DNS Name server, that generates the DNS queries attributed to the client computing device. In one embodiment, the local DNS resolver component may be provide by an enterprise network to which the client computing device 102 belongs. In another embodiment, the local DNS resolver component may be provided by an Internet Service Provider (ISP) that provides the communication network connection to the client computing device 102.

With continued reference to FIG. 1, the environment 100 can further include a service provider 104 in communication with the one or more client computing devices 102 to resolve DNS queries transmitted by the client computing devices via the communication network 108. The service provider 104 illustrated in FIG. 1 corresponds to a logical association of one or more computing devices associated with a DNS service provider. Specifically, the service provider 104 can include a number of Point of Presence ("POP") locations 110, 116, 122 that correspond to nodes on the communication network 108. Each POP 110, 116, 122 includes a DNS component 112, 118, 124 made up of a number of DNS server computing devices for resolving DNS queries from the client computers 102. Each POP 110, 116, 122 also includes resource cache components 114, 120, 126 for maintaining information related to status of various network computing components. The DNS components 112, 118, 124 may further include additional software and/or hardware components that facilitate communications including, but not limited to, load balancing or load sharing software/hardware components.

In an illustrative embodiment, the DNS component 112, 118, 124 and resource cache component 114, 120, 126 are considered to be logically grouped, regardless of whether the components, or portions of the components, are physically separate. Additionally, although the POPs 110, 116, 122 are illustrated in FIG. 1 as logically associated with the service provider 104, the POPs will be geographically distributed throughout the communication network 108 in a manner to best serve various demographics of client computing devices 102. Additionally, one skilled in the relevant art will appreciate that the service provider 104 can be associated with various additional computing resources, such additional computing devices for administration of content and resources, and the like.

With further continued reference to FIG. 1, the environment 100 can also include a network computing provider 106 in communication with the one or more client computing devices 102 and the service provider 104 via the communication network 108. The network computing provider 106 illustrated in FIG. 1 also corresponds to a logical association of one or more computing devices associated with a network computing and storage provider. Specifically, the network computing provider 106 can include a number of Point of Presence ("POP") locations 128, 132, 136 that correspond to nodes on the communication network 108. Each POP 128, 132, 136 includes a network computing component (NCC) 130, 134, 138 for hosting applications, such as data streaming applications, via a number of instances of a virtual machine, generally referred to as an instance of an NCC. As will be explained in greater detail, each virtual instances hosted by an NCC is associated with an identifier that can be used by the client computing devices 102.

One skilled in the relevant art will appreciate that NCC 130, 134, 138 would include physical computing device resources and software to provide the multiple instances of a virtual machine or to dynamically cause the creation of instances of a virtual machine. Such creation can be based on a specific request, such as from a client computing device, or the NCC can initiate dynamic creation of an instance of a virtual machine on its own. Each NCC POP 128, 132, 136 may also include storage components made up of a number of storage devices. The NCCs 128, 132, 136 may further include additional software and/or hardware components that facilitate communications including, but not limited to, load balancing or load sharing software/hardware components for selecting instances of a virtual machine supporting a requested application or providing information to a DNS nameserver to facilitate request routing.

In an illustrative embodiment, NCCs 128, 132, 136 are considered to be logically grouped, regardless of whether the components, or portions of the components, are physically separate. Additionally, although the NCC POPs 128, 132, 136 are illustrated in FIG. 1 as logically associated with the network computing provider 106, the NCC POPs will be geographically distributed throughout the communication network 108 in a manner to best serve various demographics of client computing devices 102. Additionally, one skilled in the relevant art will appreciate that the network computing provider 106 can be associated with various additional computing resources, such additional computing devices for administration of content and resources, and the like. Even further, one skilled in the relevant art will appreciate that the components of the network computing provider 106 and components of the service provider 104 can be managed by the same or different entities.

With reference now to FIGS. 2-5B, the interaction between various components of the environment 100 of FIG. 1 will be illustrated. For purposes of the example, however, the illustration has been simplified such that many of the components utilized to facilitate communications are not shown. One skilled in the relevant art will appreciate that such components can be utilized and that additional interactions would accordingly occur without departing from the spirit and scope of the present disclosure.

Illustratively, the interaction between a customer associated with a client computing device 102 and the network computing provider 106 begins with the registration of the client computing device 102 to access computing resources made available by the network computing provider 106. In one aspect, the registration process can include the exchange of business information typical in the establishment of an account, such as the exchange of financial information, establishment of desired service levels, configuration of the desired service, and the like. In another aspect, the registration process can include the generation of information utilized by the customer, via the client computing device 102, to access the desired service, such as account identifiers, passwords and information for accessing the service provider. In addition to the registration with the network computing provider 106, the customer can also register with the service provider 104 in order to allow the service provider 104 to process DNS queries for a domain with the computing resources made available by the network computing provider 106. As will be explained in greater detail, the registration with the service provider 104 will also configure the service provider 104 to manage computing resources made available by the network computing provider 106.

Figure 2:
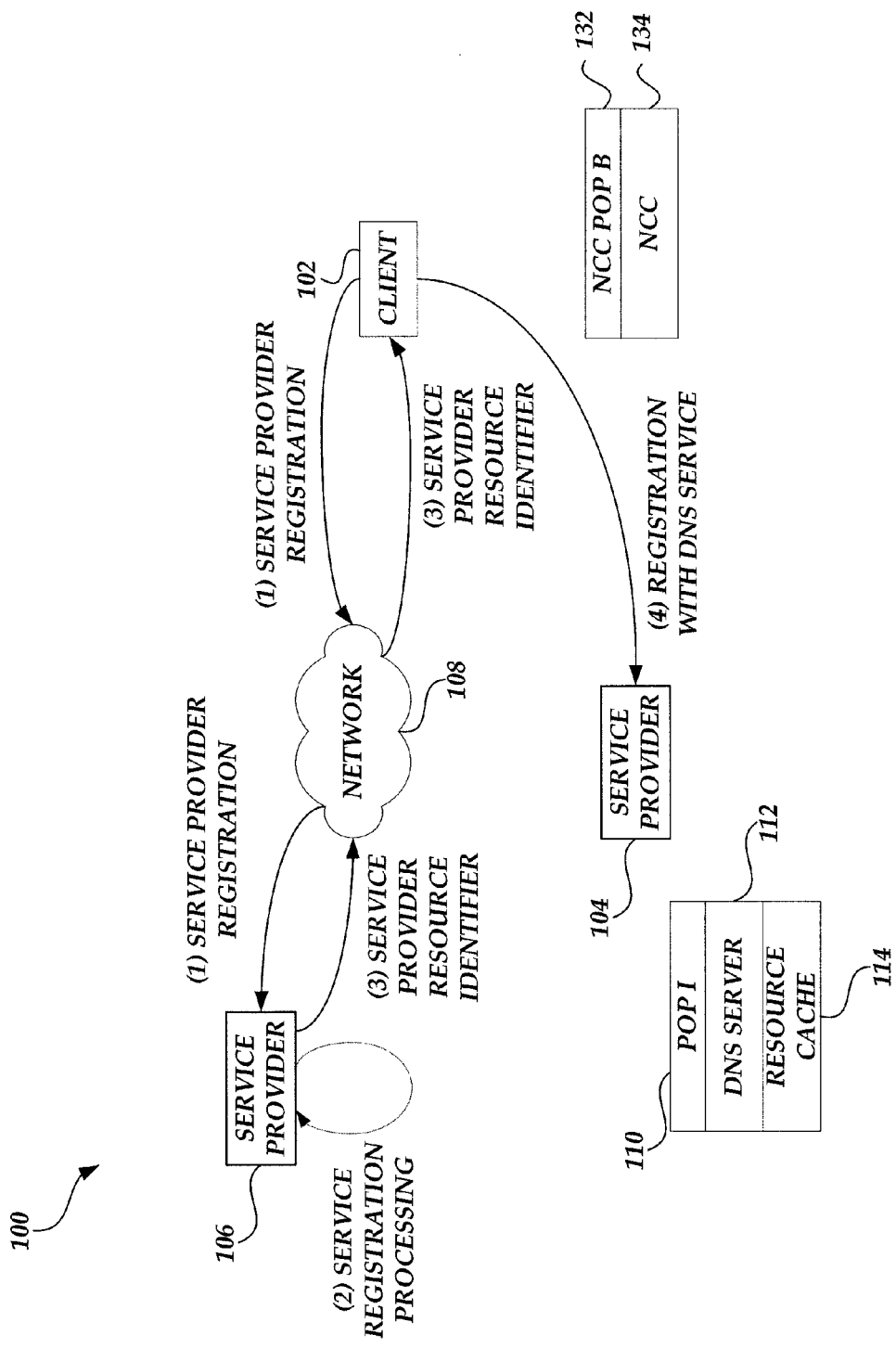
FIG. 2 is a block diagram of the environment of FIG. 1 illustrating the registration of client computing devices with a network computing provider.

In accordance with aspects of the present application, the client computing device 102 can access one or more computing devices associated with the network computing provider 106 by utilizing a resource identifier, such as uniform resource identifier ("URL") that will be used by, which will be generally referred to as a network computing provider URL. For purposes of an illustrative example, the network computing provider URL can be characterized into two portions. The first portion identifies a domain that will used to access the network computing provider resources. Illustratively, the domain can include, but is not limited to, a domain associated with a network computing provider 106 (e.g., networkcomputingprovider.com), a domain associated with a client computing device (e.g., anydomain.com), or a domain associated with a third party (e.g., third_party_domain.com). Additionally, the first portion of the network computing provider URL can also identify one or more specific types of devices or services associated with the identified domain (e.g., services or myapplication). The first portion of the network computing provider URL can be generally referred to as a DNS portion of the network computing provider URL. Additionally, a second portion of the network computing provider URL can also include additional information utilized in the processing and request of services ("extra_information"). In a first set of illustrative examples, the network computing provider URL has the form of:

http://services.network_computing_provider.com/extra_information http://myapplication.anydomain.com/extra_information In accordance with an illustrative embodiment, in addition to the above information, the first portion of the network computing provider URL (e.g., the DNS portion of the network computing provider URL) can also include additional information that will be used by a DNS query processing service to manage one or more virtual machine instances associated with the client computing device transmitting the DNS query. More specifically, the DNS portion of the network computing provider URL can include one or more identifiers, or other information, that can be used to associate the DNS query to one or more-instantiated virtual machine instances by the network computing provider associated with the domain (e.g., "unique_identifier"). In one embodiment, the unique identifier can correspond to an identifier utilized by the network computing provider 106 to manage previously instantiated computing resources. In another embodiment, the unique identifier can correspond to an identifier utilized by the network computing provider 106 to instantiate computing resources. Illustratively, the unique identifier can be unique to a single customer/client computing device 102 or unique to a set of customers or client computing devices 102. In this embodiment, the DNS server can parse the unique identifier information from the DNS portion of the network computing provider URL and utilize the identifier, or identifiers, to manage virtual machine instances, as will be described. In other illustrative examples, the network computing provider URL has the form of:

http://unique_identifier.services.network_computing_provider.com/extra_information http://unique_identifier.myapplication.mydomain.com/extra_information In accordance with further embodiments, in addition to the above information, the first portion of the network computing provider URL can also include additional information that will be used by a DNS query processing service as part of a request routing processes to identify one or more NCC POPs that may be best suited to service requests from the client computing devices 102. More specifically, the DNS portion of the network computing provider URL can include one or more identifiers, or other information, that can be used by the DNS server to identify which NCC POP may be best suited to process the client computing device requests (e.g., "routing_information"). The additional information can be combined with the unique identifiers included in the network computing provider URL or independent of any unique identifiers included in the network computing provider URL. Illustratively, the "routing_information" can directly or indirectly identify service level information related to a desired service level, financial information related to a financial cost to be incurred as part of the request routing service, preferred routing algorithms, geographic identifiers, preferred POPs, and the like. Illustratively, the DNS server can parse the routing information from the DNS portion of the network computing provider URL and utilize the routing information as part of a request routing algorithm. In this illustrative example, the network computing provider URL has the form of:

http://routing_information.unique_identifier.services.network_computing provider.com/extra_information http://routing_information.myapplication.mydomain.com/extra_information Turning now to FIG. 2, an illustrative interaction for the registration of client computing devices 102 with a network computing provider 106 will be described. At (1), the client computing device 102 initiates the registration process by transmitting a request to the network computing provider 106. In one embodiment, the transmission of the request can correspond to the generation of various user interfaces to collect information from the customer associated with the client computing device 102 and transmit the collected information in accordance with an Application Protocol Interface ("API"). In other embodiments, the client computing device 102 may be configured to obtain or transmit information to the network computing provider 106 via an API without the need to generate user interfaces.

At (2), the network computing provider 106 obtains the registration request and processes the request to establish the requested account, update an existing account or otherwise establish the availability of the service for the customer. As will be explained in greater detail, the processing of the request can include the generation of the network computing provider URL, the one or more identifiers, including the unique identifier, that will be used as part of the network computing provider URL or that will be associated with the network computing provider URL. As previously described, in one embodiment, the registration process with the network computing provider 106 corresponds to the generation of a unique identifier that can be used by the network computing provider 106 to manage one or more computing resources instantiated on behalf of the customer/client computing device 102. For example, in this embodiment, the unique identifier can be used to determine whether previously instantiated virtual machine instances are available for further processing or to cause the re-instantiation of previously instantiated virtual machine instances.

In another embodiment, the registration process with the network computing provider 106 corresponds to the generation of a unique identifier that defines one or more attributes of computing devices resources that can be instantiated on behalf of the customer/client computing device 102. In this embodiment, the unique identifier can be utilized to cause the initial instantiation of the computing resources, such as one or more virtual machine instances. Illustratively, the registration process for the instantiation of computing device resources can include, but is not limited to, the specification of various hardware and software parameters for the computing device resources (physical or virtual), the configuration of various parameters (communication, security, etc.), the specification of financial cost parameters, the specification of service level agreements, and the like. Such unique identifiers may be selected from a pre-existing set of identifiers or may represent a unique configuration.

At (3), the service provider 106 transmits the network computing provider URL, unique identifiers, or a portion thereof, to the client computing device 106. The transmission can also include additional confirmation information or other information that may be used by the client computing device 102 to communicate with the service provider 106 or requests services from the network computing provider 106.

At (4), the receiving client computing device 102 then transmits a registration request with the service provider 104 to associate a network computing provider URL with one or more instance identifiers provided by the network computing provider 106. In one embodiment, the registration with the service provider 104 can correspond to a request for the service provider 104 to function as DNS query processing authority for one or more network computing provider URLs. In another embodiment, the service provider 104 may already function as the DNS query processing authority for the network computing provider URL. Accordingly, the request can corresponds to the association of the unique identifiers provides by the network computing provider 106 with the network computing provider URL. In still other embodiments, if the network computing provider URL corresponds to a domain not controlled by the client computing device 102 (e.g., serviceprovider.com), the service provider 104 may function as the DNS query processing authority for the network computing provider URL. Accordingly, the request can corresponds to the association of the unique identifiers provides by the network computing provider 106 with the network computing provider URL.

Figure 3A:
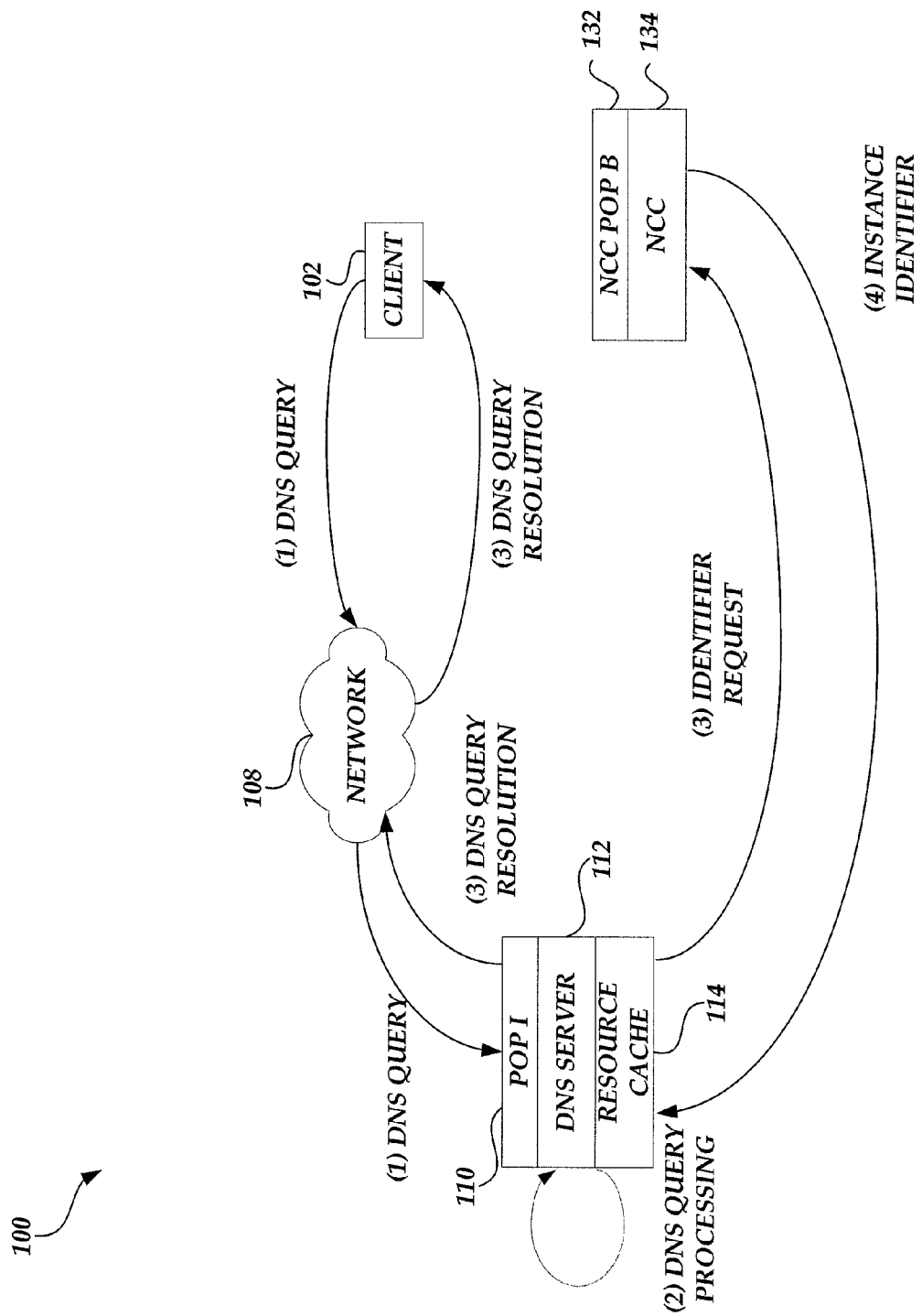
FIG. 3A is a block diagram of the environment of FIG. 1 illustrating the processing of a DNS query related to an initial request for instantiation of a hosted virtual machine instance by the network computing provider on behalf of a client computing device.

With reference to FIG. 3A, an illustrative interaction for the eventual transmission of a service request, such as request for the initiation of a hosted virtual machine instance by the network computing provider 106 on behalf of a client computing device 102. For purposes of an illustrative example, the interaction illustrated in FIG. 3A occurs at some point in time after the registration of the client computing device 102 with the network computing provider 106 and service provider 104 is complete, or otherwise, responsive to the completion of the registration process as illustrated in FIG. 2. As illustrated in FIG. 3A, the process begins at (1) with the transmission of a DNS query by a client computing device 102 to the service provider 104 to identify a network address of a particular NCC associated with the service provider 106. Illustratively, the DNS query corresponds to the network computing provider URL previously provided to the client computing device 102 during the registration process (FIG. 2).

One skilled in the relevant art will appreciate that the processing of a DNS query would begin with the identification of a DNS server authoritative to the "." and the "com" portions of the translated URL. The issuance of DNS queries corresponding to the "." and the "com" portions of a URL are well known and have not been illustrated. Accordingly, as illustrated in FIG. 3A, after resolving DNS queries associated with the "." and "com" portions of the network computing provider URL, the client computing device 102 then issues a DNS query for the network computing provider URL that results in the identification of a DNS server authoritative to the portion of the network computing provider URL, in this example one of the DNS server components 112 at POP 110 associated with service provider 104

At (2), the DNS server component 112 parses the DNS query to obtain any identifier (or other information) transmitted in the DNS portion of the network computing provider URL. At (3), the DNS server component 112 at service provider 104 resolves the DNS query by identifying either a network address of an NCC component or an alternative identifier that will be utilized to identify an appropriate NCC component. Illustratively, because the DNS server component 112 receives an initial DNS query that includes unique identifier in the DNS portion of the network computing provider URL that has not been previously utilized, the DNS server component maintains information associating the unique identifier a specific network address utilized to resolve the DNS query and an identifier of the specific instance of the network computing provider 106. Accordingly, at (4), the service provider 104 transmits and receives instance identification information based on a DNS query at (5). At (6), the DNS query is resolved by transmitting the above information to the client computing device 102. One skilled in the relevant art will appreciate that the resolution of the DNS query and the maintenance of the mapping of network addresses to network computing provider 106 identifiers can occur in a different order than the order illustrated in FIG. 3A.

In an illustrative embodiment, one or more DNS components of the service provider 104 maintain tables that associate the network computing provider URL, any unique identifiers in the network computing provider URL, or combination thereof with network addresses and other identifiers associated with the NCC components of the network computing provider 106. Additionally, the DNS components of the service provider 104 can also maintain various routing information, preferences or other information that were utilized in previous request routing processes. The tables can then be utilized in processing subsequent DNS queries. In one embodiment, the table is maintained individually by one or more DNS components of the service provider 104. In other embodiments, the table (or tables) may be distributed among a select subset of the DNS components in accordance with one or more distribution schemes implemented by the service provider 104.

Table 1 illustrates an illustrative embodiment of a portion of a table utilized by a DNS component of the service provider 104:

TABLE 1

| Unique Identifier | Unique Identifier | Network Address | Routing Information |
| --- | --- | --- | --- |
| unique_identifier 1 | 1-xxx | 123.45.678.90 | None |
| any domain.com | 5-xxx | 345.78.910.11 | service level |
| ... | ... | ... | ... |
| unique_identifier x1 | 67-xxx | 444.33.890.12 | cost information |

Table 2 illustrates another illustrative embodiment of a portion of a table utilized by a DNS component of the service provider 104 in which computing. As illustrated in Table 2, the first two entries in Table 2 correspond to examples in which computing device resources have not been instantiated by the network computing provider 106 on behalf of the customer/client computing device 102.

TABLE 2

| Unique Identifier | Unique Identifier | Instance Identifier | Network Address | Routing Information |
| --- | --- | --- | --- | --- |
| unique_identifier x yourdomain.com | | identifier x Identifier | | |
| ... | ... | ... | ... | ... |
| unique_identifier x1 | 67-xxx | | 444.33.890.12 | cost information |

One skilled in the art will appreciate that a table would not necessarily need to have the routing information associated with previous request routing information. Additionally, the tables may require more or less information depending on the relationship between the service provider 104 and the network computing provider 106.

Figure 3B:
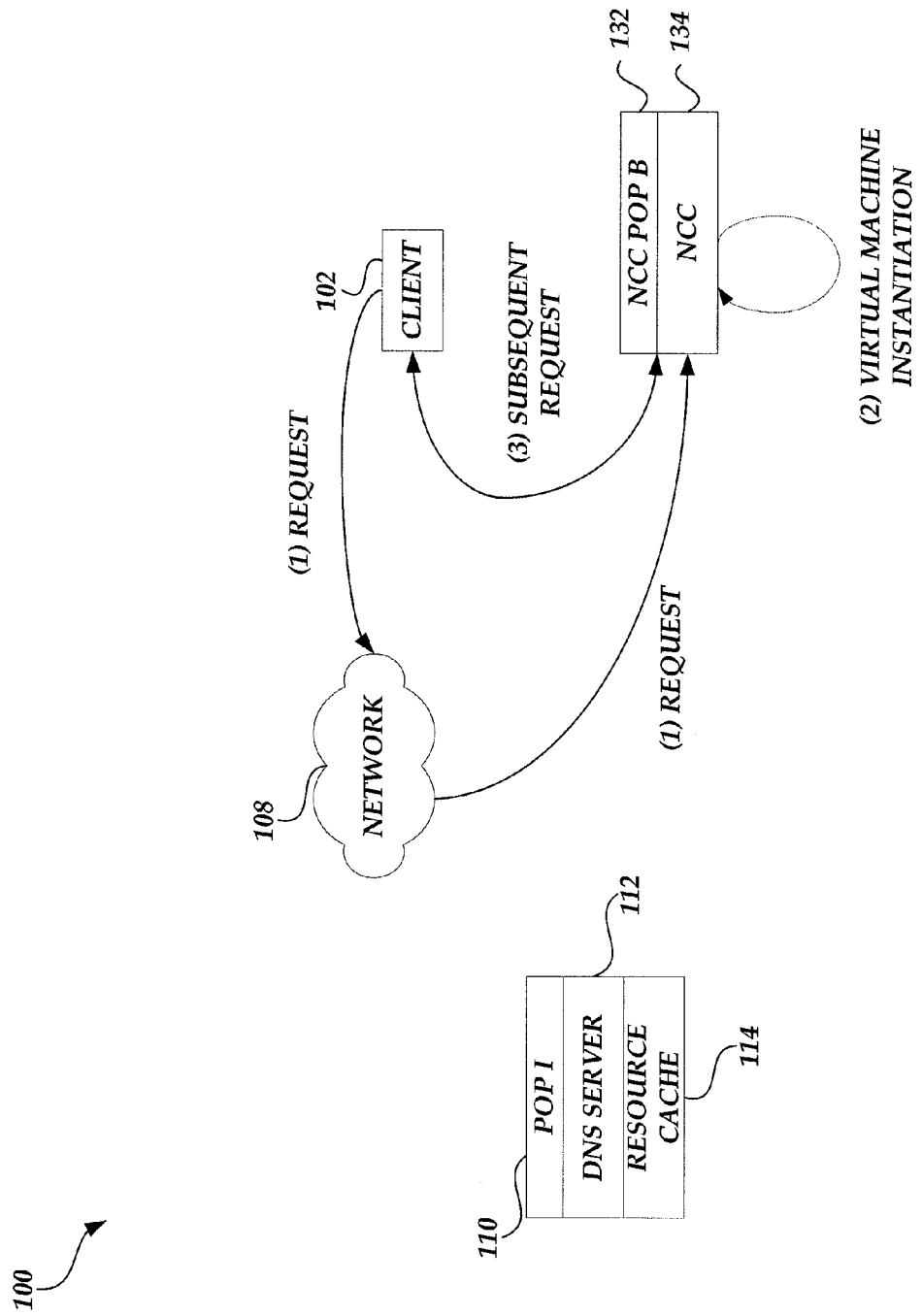
FIG. 3B is a block diagram of the environment of FIG. 1 illustrating an initial request for instantiation of a hosted virtual machine instance by the network computing provider on behalf of a client computing device.

Turning now to FIG. 3B, illustrating an initial request for instantiation of a hosted virtual machine instance by the network computing provider on behalf of a client computing device will be described. At (1), the client computing device 102 transmits a request to the network computing provider 106 associated with the resolved DNS query. At (2), the network computing provider 106 processes the request and instantiates one or more hosted virtual machines instances corresponding to the request. Additionally, at (3), the network computing provider 106 and client computing device 102 can begin interacting as the client computing device 102 interfaces with virtual machine instances hosted on the NCC 134.

Figure 4:
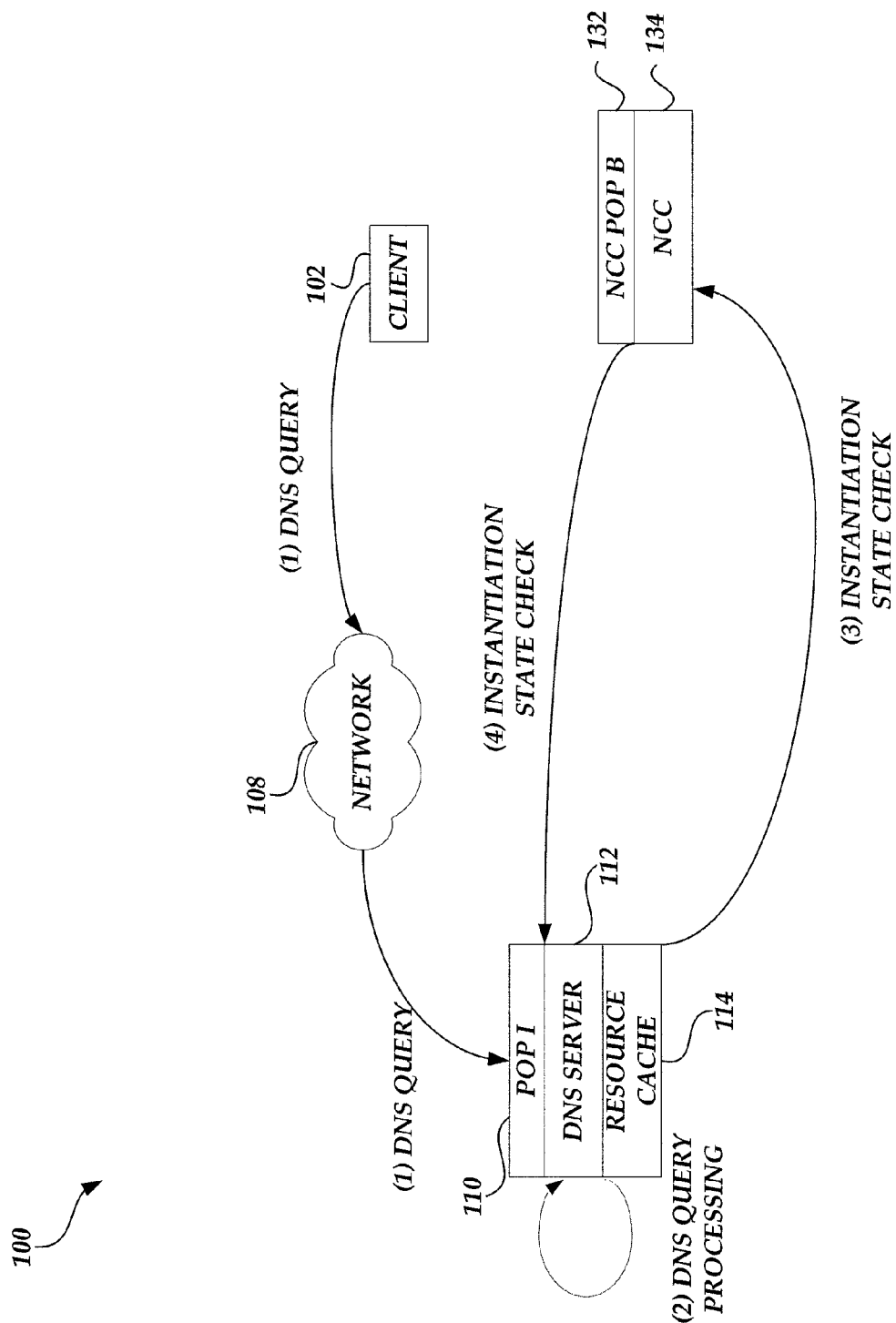
FIG. 4 is a block diagram of the environment of FIG. 1 illustrating the processing of a DNS query related to a subsequent request for access of a hosted virtual machine instance by the network computing provider on behalf of a client computing device.

With reference to FIG. 4, for purposes of an illustrative example, at some point, the client computing device 102 has ceased interaction with the NCC 132, at least temporarily. Depending on the time elapsed between interactions, the network computing provider 106 can either terminate a hosted instance, while maintaining information related to the state of the virtual machine instance prior to termination.

In one embodiment, to access the service again, the client computing device 102 initiates a subsequent DNS query to the service provider 104. As illustrated in FIG. 4, the process begins at (1) with the transmission of a DNS query by a client computing device 102 to the service provider 104. Illustratively, the client computing device 102 would utilize the same (or similar) network computing provider URL that was previously transmitted during the initial DNS query to the service provider 104 (FIG. 3A).

With continued reference now to FIG. 4, at (2), upon receipt of the DNS query, the DNS server parses the DNS query to obtain any identifier (or other information) associated with the previously instantiated hosted virtual machine. One skilled in the relevant art will appreciate that parsing the network computing provider URL can include parsing the "unique_identifier" information included in the DNS portion of the network computing provider URL. Alternatively, the DNS server may utilize all the DNS portion of the network computing provider URL as the "unique_identifier" portion, especially in embodiments in which no additional information is utilized for request routing is included in the DNS portion of the network computing provider URL. For example, the DNS server can utilize the identified domain (e.g., "anydomain.com") to recall the identifier.

At (3), the DNS server can then determine whether the previously instantiated hosted virtual machine is still instantiated and available to process a subsequent request from the client computing device 102. In one embodiment, the DNS server can transmit a request to the network computing provider 106 to determine in real time or substantially real time whether the network computing provider 106 has terminated the previously instantiated hosted virtual machine instance. For example, the DNS server 112 can reference a table that identifies the instance identifier with the unique identifier included in the network computing provider URL and transmit a request to the network computing provider 106 as part of an API. In another embodiment, the network computing provider 106 can maintain information related to the instantiation state of a number of hosted virtual machine instances that can be polled. In this embodiment, the network computing provider 106 would periodically poll for the status of a set of hosted virtual machine instances or be informed when a previously instantiated virtual machine instance has been terminated.

TABLE 3

| Unique Identifier | Instance Identifier | Network Address | Routing Information | Status |
|---|---|---|---|---|
| unique_identifier 1 | 1-xxx | 123.45.678.90 | None | Active |
| unique_identifier 2 | 5-xxx | 345.78.910.11 | service level | Non-active |
| ... | ... | ... | ... | ... |
| unique_identifier x1 | 67-xxx | 444.33.890.12 | cost information | Active |

With reference to the previous example, Table 3 illustrates an embodiment in which the DNS server components maintain information related to whether one or more previously instantiated virtual machine instances remain active. Additionally, the DNS servers can maintain information related to whether the active virtual machine instances available to process a subsequent requests.

Figure 5A:
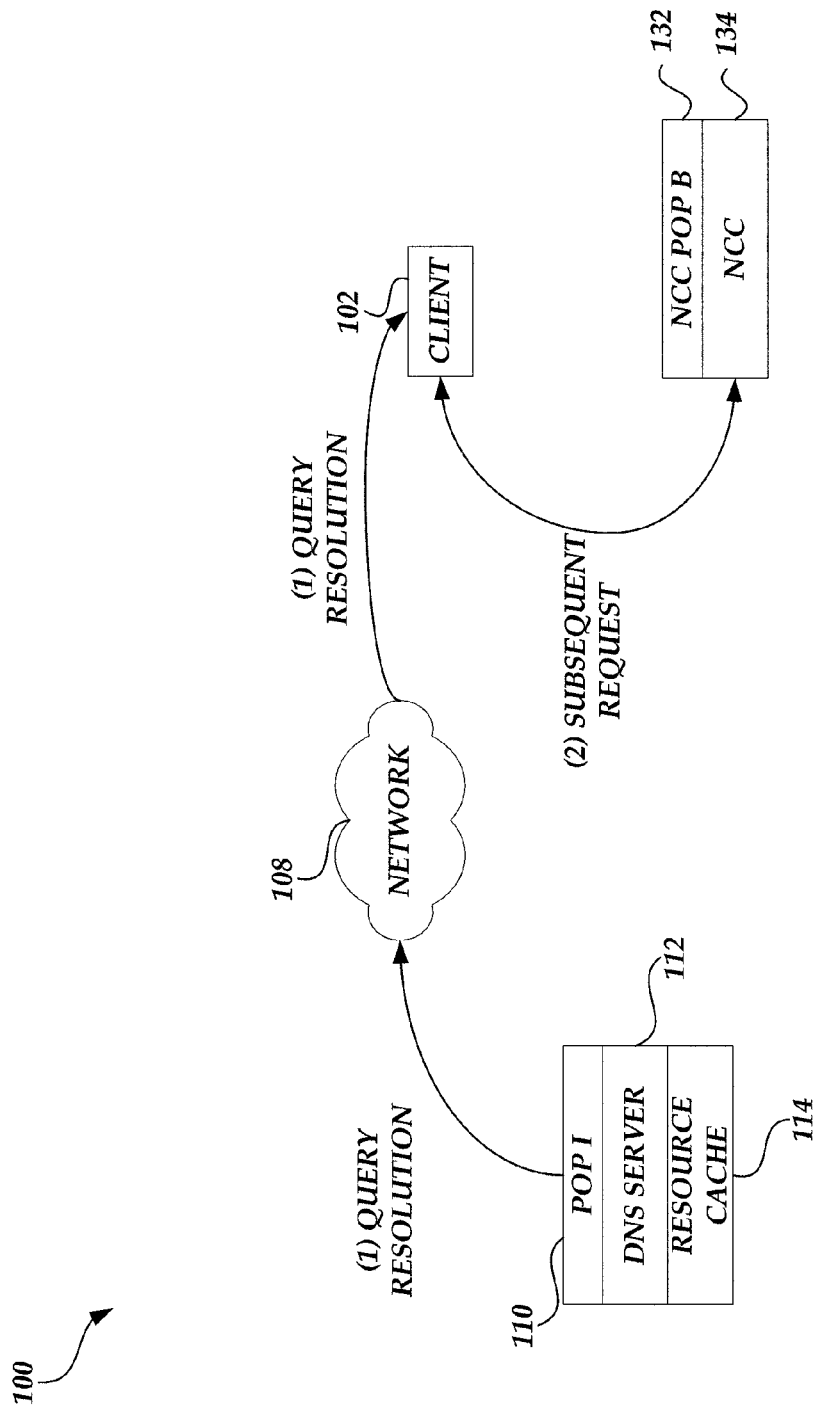
FIG. 5A is a block diagram of the environment of FIG. 1 illustrating the processing of a subsequent for access of a hosted virtual machine instance by the network computing provider on behalf of a client computing device.

With reference to FIG. 5A, if the previously instantiated hosted virtual machine instance is still instantiated and available to process subsequent requests, the DNS server can utilize network identifiers associated with the previously instantiated hosted virtual machine instance to resolve the DNS query. In one embodiment, at (1) the DNS server will resolve the DNS query by identifying the network address or an alternative identifier associated with the previously instantiated hosted virtual machine instance. At (2), the client computing device 102 utilizes the returned network address for the subsequent requests.

In an alternative embodiment, the DNS server may utilize additional request routing information to determine that a different virtual machine instance may be better suited to process the subsequent request by the client computing device 102. In one example, the processing of the request routing information may be indicative of lower cost estimates that may meet cost criteria for a different instantiated virtual machine instance of the network computing provider 106. In such embodiments, the DNS server 112 would transmit a request to instantiate a new hosted virtual machine instance in accordance with the request routing information.

In another example, the service provider 104 can utilize geographic criteria as additional request routing information. The geographic criteria can correspond to geographic-based regional service plans contracted between the service-provider 106 and the client computing device 102. Accordingly, a client computing device 102 DNS query received in a region not corresponding to the network computing provider 106's regional plan may be better processed by computing devices in a region corresponding to the network computing provider 106's regional plan.

In a further example, the service provider 104 can also analyze the DNS query according to service level criteria. The service level criteria can correspond to service or performance metrics contracted with the network computing provider 106. Examples of performance metrics can include latencies of data transmission between the service provider POPs and the client computing devices 102, total data provided on behalf of the network computing provider 106 by the service provider POPs, error rates for data transmissions, and the like.

In still a further example, the service provider 104 can process the DNS query according to network performance criteria. The network performance criteria can correspond to measurements of network performance for transmitting data from the service provider POPs to the client computing device 102. Examples of network performance metrics can include network data transfer latencies (measured by the client computing device or the network computing provider 106, network data error rates, and the like.

In yet a further example, the receiving DNS server process the DNS query for load balancing or load sharing purposes. The receiving DNS may obtain an identification of other POPs that define an order for such load balancing/load sharing. The list can be dynamic or periodically updated based on current network conditions.

Figure 5B:
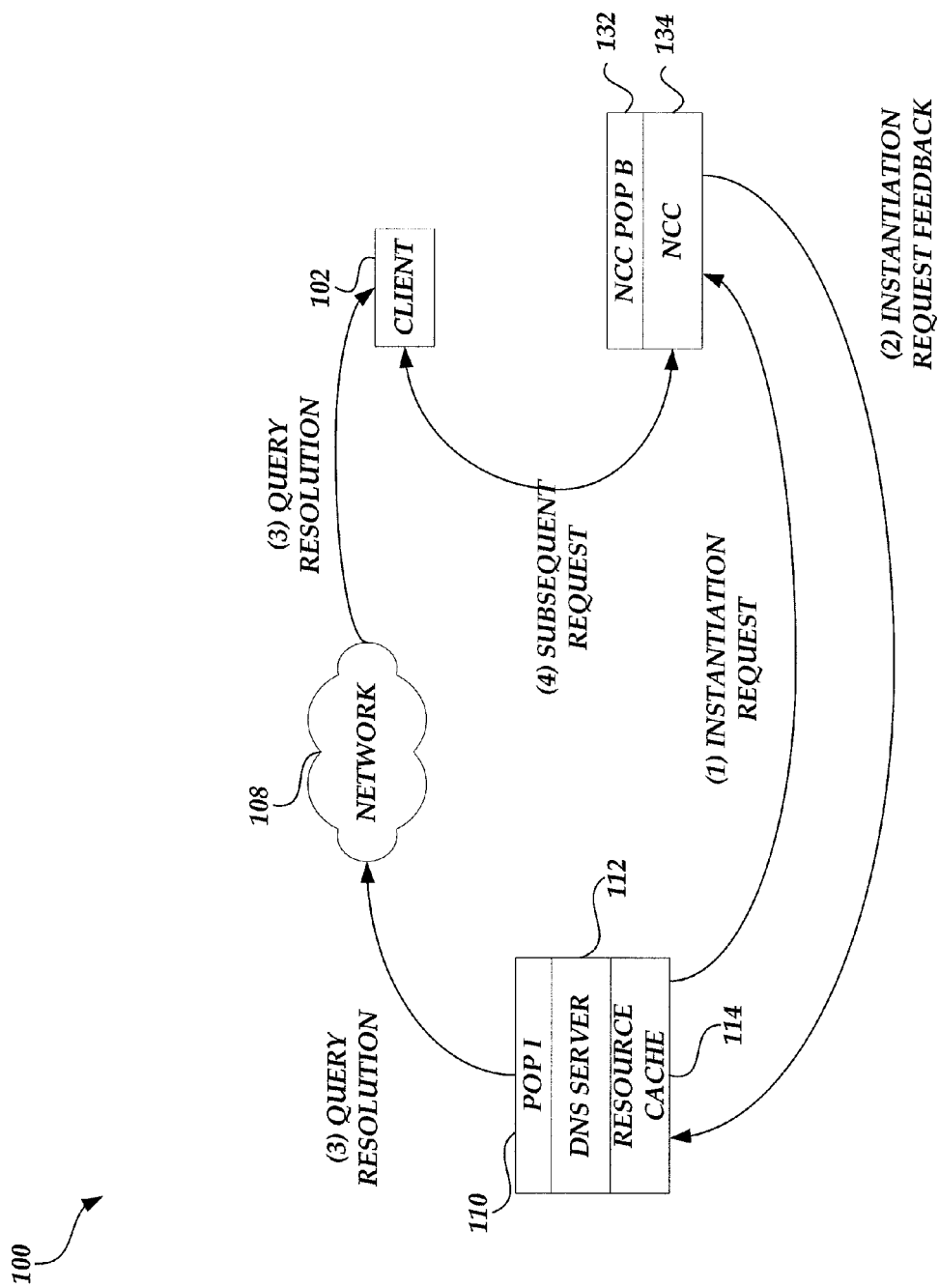
FIG. 5B is a block diagram of the environment of FIG. 1 illustrating the processing of a subsequent for access of a hosted virtual machine instance by the network computing provider on behalf of a client computing device.

With reference now to FIG. 5B, if the previously instantiated hosted virtual machine instance is not still instantiated and otherwise unavailable to process subsequent requests, the DNS server can cause the instantiation a new instance of the previously instantiated virtual machine instance. In one embodiment, at (1) the DNS server will transmit a request to instantiate a new version (e.g., "re-instantiate") of the hosted virtual machine instance. At (2), the NCC processes the requests and begins to instantiate a hosted virtual machine instance corresponding to the request. At (3), the DNS server transmits network identifiers for the re-instantiated hosted virtual machine instance. At (4), the DNS server resolves the DNS query by identifying the network address or an alternative identifier associated with the previously instantiated hosted virtual machine instance. At (5), the client computing device 102 utilizes the returned network address for the subsequent requests.

Figure 6:
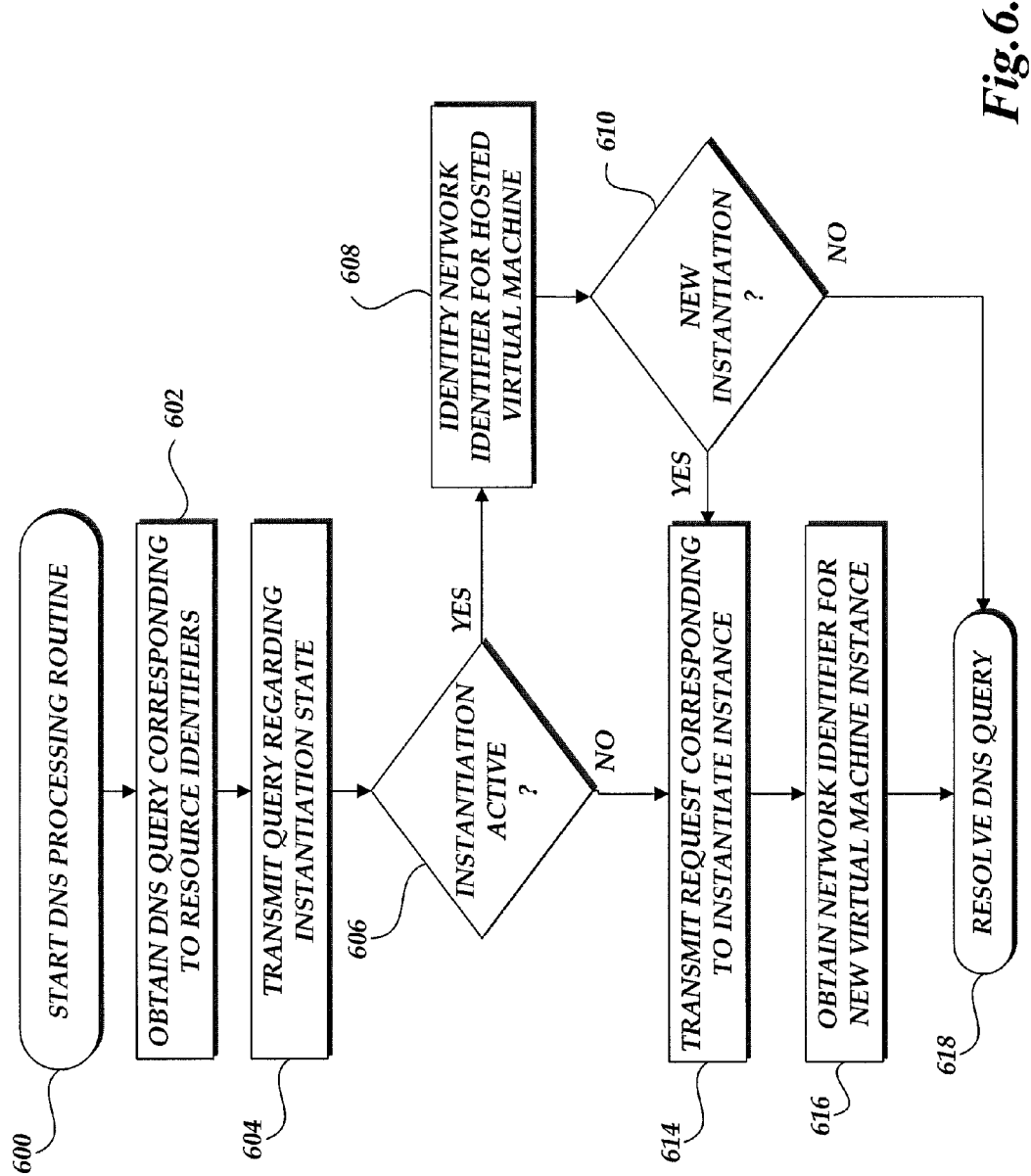
FIG. 6 is a flow diagram of a DNS query processing routine implemented by a DNS server.

With reference now to FIG. 6, a request routine 600 implemented by the service provider 104 to process DNS queries will be described. One skilled in the relevant art will appreciate that actions/steps outlined for routine 600 may be implemented by one or many computing devices/components that are associated with the service provider 104. Accordingly, routine 600 has been logically associated as being performed by the service provider 104.

At block 602, one of the DNS server components 112, 116, 122 receives a DNS query corresponding to a network computing provider URL. As previously discussed, the network computing provider URL includes an identifier corresponding a previously instantiated hosted virtual machine instance. The DNS portion of the network computing provider URL can be parsed to obtain the identifier. As previously discussed, in one embodiment, parsing of the DNS portion of the network computing provider URL can include parsing the "unique_identifier" information included in the DNS portion of the network computing provider URL. Alternatively, the DNS server may utilize all the DNS portion of the network computing provider URL as the "unique_identifier" portion, especially in embodiments in which no additional information utilized for request routing is included in the DNS portion of the network computing provider URL.

At block 604, the DNS server transmits a query to the network computing provider 106 to determine an instantiation state for a virtual machine instance associated with the unique identifier. Illustratively, the DNS server attempts to determine whether the previously instantiated hosted virtual machine is still instantiated and available to process a subsequent request from the client computing device 102. In one embodiment, the DNS server can transmit a request to the network service provider 106 to determine in real time or substantially real time whether the network computing provider 106 has terminated the previously instantiated hosted virtual machine instance or whether the hosted virtual machine instance is otherwise unavailable. For example, the DNS server can transmit a request including a hosted virtual machine identifier in accordance with an API.

In another embodiment, the DNS server components or a different component of the service provider 104 can maintain information related to the instantiation state of a number of hosted virtual machine instances that can be polled. In this embodiment, the service provider 104 would periodically poll for the status of a set of hosted virtual machine instances or be informed when a previously instantiated virtual machine instance has been terminated. Accordingly, the transmission of the query regarding the instantiation state may include internal queries to the information maintained by the DNS components (or other components), a transmittal to external components, or combination thereof.

At decision block 606, a test is conducted to determine whether the selected hosted virtual machine instance is active and available to process requests if the previously instantiated hosted virtual machine instance is still instantiated and available to process subsequent requests. Illustratively, decision block 606 can correspond to an initial determination of whether one or more virtual machine instances have been previously instantiated. If so, decision block 606 would further determine whether the selected hosted virtual machine instance is still instantiated and otherwise available to process subsequent requests. If the selected hosted virtual machine instance is active and available to process requests, at block 608, the service provider 104 identifies network identifiers associated with the previously instantiated hosted virtual machine instance to resolve the DNS query. By way of illustrative example, the DNS component of the service provider 104 can utilize the table that maintains the network address of the hosted virtual machine instance to use in the resolution of the DNS query.

At decision block 610, a test is conducted to determine whether the service provider 104 should utilize a new instantiation of a hosted virtual machine instance even if the previously hosted virtual machine instance may still be instantiated. As previously described, the DNS server may utilize additional request routing information to determine that a different virtual machine instance may be better suited to process the subsequent request by the client computing device 102. In another embodiment, the network computing provider 106 may indicate that while a virtual machine instance may still be active, the network computing provider 106 would like to migrate the virtual machine instance or otherwise initiate one or more additional virtual machine instances in the place of the current virtual machine instance. If a new instantiation is determined, the routine 600 proceeds to block 614, which will be described below. Alternatively, if no new instantiation is required, at block 618, the DNS server will resolve the DNS query by identifying the network address or an alternative identifier associated with the previously instantiated hosted virtual machine instance.

Returning to decision block 606, if the previously instantiated hosted virtual machine instance has not been previously instantiate or if a previously instantiated hosted virtual machine instance is not still instantiated based on management decisions by the network computing provider 106, or if a previously instantiated hosted virtual machine instances is otherwise unavailable to process subsequent requests, the DNS server can cause the instantiation a new instance of the previously instantiated virtual machine instance. At block 614, in one embodiment, the DNS server will transmit a request to instantiate a new version (e.g., "re-instantiate") of the hosted virtual machine instance. As previously discussed, the NCC processes the requests and begins to instantiate a hosted virtual machine instance corresponding to the request. In another embodiment, if the hosted virtual machine instance has not been previously instantiated (or was terminated by the customer), the DNS server will transmit a request to create a new instantiation of a hosted virtual machine instance. As previously discussed, the NCC processes the requests and begins to instantiate a hosted virtual machine instance corresponding to the request based on the configuration information maintained for by the DNS server. At block 616, the DNS server receives the network identifiers for the re-instantiated hosted virtual machine instance. At block 618, the DNS server resolves the DNS query by identifying the network address or an alternative identifier associated with the previously instantiated hosted virtual machine instance and the routine 600 terminates.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached FIGS. should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for request routing comprising:
   obtaining, by a DNS processing service, a DNS query from a client computing device, wherein the DNS query corresponds to a resource identifier associated with a previously instantiated hosted virtual machine instance, wherein the DNS query includes an identifier associated with the previously instantiated hosted virtual machine instance, and wherein the resource identifier and the identifier associated with the previously instantiated hosted virtual machine instance are different;
   parsing, by the DNS processing service, a DNS portion of the DNS query to obtain the identifier associated with the previously instantiated hosted virtual machine instance;
   determining, by the DNS processing service, whether the previously instantiated hosted virtual machine is instantiated and available to process subsequent requests from the client computing device;
   if the previously instantiated hosted virtual machine is instantiated and available to process subsequent requests from the client computing device, resolving, by the DNS processing service, the DNS query by transmitting information associated with the previously instantiated hosted virtual machine instance; and
   if the previously instantiated hosted virtual machine instance is not instantiated and available to process subsequent requests from the client computing device,
      transmitting, by the DNS processing service, a request to re-instantiate the previously instantiated hosted virtual machine;
      obtaining, by the DNS processing service, information corresponding to the re-instantiation of the previously instantiated hosted virtual machine; and
      resolving, by the DNS processing service, the DNS query by transmitting information associated with the re-instantiated hosted virtual machine instance.

2. The method as recited in claim 1, wherein parsing the DNS portion of the DNS query to obtain the identifier associated with the previously instantiated hosted virtual machine instance includes parsing a complete DNS portion of the DNS query.

3. The method as recited in claim 1, wherein parsing the DNS portion of the DNS query to obtain the identifier associated with the previously instantiated hosted virtual machine instance includes parsing a sub-portion of the DNS portion of the DNS query.

4. The method as recited in claim 1, wherein resolving the DNS query by transmitting information associated with the re-instantiated hosted virtual machine instance includes transmitting a canonical name record identifier associated with a service provider hosting the previously instantiated hosted virtual machine instance.

5. The method as recited in claim 1, wherein resolving the DNS query by transmitting information associated with the re-instantiated hosted virtual machine instance includes transmitting a network address associated with a service provider hosting the previously instantiated hosted virtual machine instance.

6. The method as recited in claim 1 further comprising maintaining, for a set of previously instantiated virtual machine instances, information related to an availability to process subsequent requests from the client computing device.

7. The method as recited in claim 6 further comprising:
   periodically transmitting requests related to availability to process subsequent requests from the client computing device for the set of previously instantiated virtual machine instances;
   obtaining updated information related to availability to process subsequent requests from the client computing device for the set of previously instantiated virtual machine instances;

updating the information related to an availability to process subsequent requests from the client computing device responsive to the updated information;

obtaining a request from the client computing device for the requested content; and processing and transmitting the requested content from the selected network computing component in response to the request from the client computing device.

8. A method for request routing comprising:

obtaining, by a DNS processing service, a DNS query from a client computing device, wherein the DNS query corresponds to a resource identifier associated with a previously instantiated hosted virtual machine instance, wherein the DNS query includes an identifier associated with the previously instantiated hosted virtual machine instance, and wherein the resource identifier and the identifier associated with the previously instantiated hosted virtual machine instance are different;

determining, by the DNS processing service, whether the previously instantiated hosted virtual machine associated with the DNS query is instantiated and available to process subsequent requests from the client computing device; and if the previously instantiated hosted virtual machine instance is not instantiated and available to process subsequent requests from the client computing device, resolving, by the DNS processing service, the DNS query by transmitting information associated with a re-instantiation of the previously instantiated hosted virtual machine instance.

9. The method as recited in claim 8, wherein if the previously instantiated hosted virtual machine is instantiated and available to process subsequent requests from the client computing device, resolving the DNS query by transmitting information associated with the previously instantiated hosted virtual machine instance.

10. The method as recited in claim 9, wherein prior to resolving the DNS query by transmitting information associated with the previously instantiated hosted virtual machine instance, determining whether a new instantiation of the previously instantiated hosted virtual machine instance should be initiated.

11. The method as recited in claim 10, wherein determining whether a new instantiation of the previously instantiated hosted virtual machine instance should be initiated includes evaluating updated request routing information corresponding to the DNS query.

12. The method as recited in claim 8 further comprising parsing a DNS portion of the DNS query to obtain the identifier associated with the previously instantiated hosted virtual machine instance.

13. The method as recited in claim 8 further comprising maintaining, for a set of previously instantiated virtual machine instances, information related to an availability to process subsequent requests from the client computing device.

14. The method as recited in claim 13 further comprising:

periodically transmitting requests related to availability to process subsequent requests from the client computing device for the set of previously instantiated virtual machine instances;

obtaining updated information related to availability to process subsequent requests from the client computing device for the set of previously instantiated virtual machine instances; and updating the information related to an availability to process subsequent requests from the client computing device responsive to the updated information.

15. The method as recited in claim 8, wherein resolving the DNS query by transmitting information associated with a re-instantiation of the previously instantiated hosted virtual machine instance includes:

transmitting, by the DNS processing service, a request to re-instantiate the previously instantiated hosted virtual machine;

obtaining, by the DNS processing service, information corresponding to the re instantiation of the previously instantiated hosted virtual machine; and resolving, by the DNS processing service, the DNS query by transmitting information associated with the re-instantiated hosted virtual machine instance.

16. A method for request routing comprising:

obtaining, by a DNS processing service, a DNS query from a client computing device, wherein the DNS query corresponds to a resource identifier associated with a previously instantiated hosted virtual machine instance, wherein the DNS query includes an identifier associated with the previously instantiated hosted virtual machine instance, and wherein the resource identifier and the identifier associated with the previously instantiated hosted virtual machine instance are different;

evaluating, by the DNS processing service, whether the previously instantiated hosted virtual machine associated with the DNS query is instantiated; and if the previously instantiated hosted virtual machine instance is not instantiated, resolving, by the DNS processing service, the DNS query by transmitting information associated with a re-instantiation of the previously instantiated hosted virtual machine instance.

17. The method as recited in claim 16, wherein if the previously instantiated hosted virtual machine is instantiated, resolving the DNS query by transmitting information associated with the previously instantiated hosted virtual machine instance.

18. The method as recited in claim 17, wherein prior to resolving the DNS query by transmitting information associated with the previously instantiated hosted virtual machine instance, determining whether a new instantiation of the previously instantiated hosted virtual machine instance should be initiated.

19. The method as recited in claim 18, wherein determining whether a new instantiation of the previously instantiated hosted virtual machine instance should be initiated includes evaluating updated request routing information corresponding to the DNS query.

20. The method as recited in claim 16 further comprising parsing a DNS portion of the DNS query to obtain the identifier associated with the previously instantiated hosted virtual machine instance.

21. The method as recited in claim 20, wherein parsing the DNS portion of the DNS query includes obtaining an identifier identifying the previously instantiated hosted virtual machine instance from the DNS portion of the DNS query.

22. The method as recited in claim 20, wherein parsing the DNS portion of the DNS query includes obtaining additional request routing information from the DNS portion of the DNS query.

23. The method as recited in claim 16 further comprising maintaining, for a set of previously instantiated virtual machine instances, information related a current instantiation state for the set of previously instantiated virtual machine instances.

24. The method as recited in claim 23 further comprising:
periodically transmitting requests related an instantiation state for the set of previously instantiate virtual machine instances;
obtaining updated information related instantiation state for the set of previously instantiate virtual machine instances; and
updating the information related to the instantiation state for the set of previously instantiate virtual machine instances.

25. The method as recited in claim 16, wherein resolving the DNS query by transmitting information associated with a re-instantiation of the previously instantiated hosted virtual machine instance includes:
transmitting, by the DNS processing service, a request to re-instantiate the previously instantiated hosted virtual machine;
obtaining, by the DNS processing service, information corresponding to the re instantiation of the previously instantiated hosted virtual machine; and
resolving, by the DNS processing service, the DNS query by transmitting information associated with the re-instantiated hosted virtual machine instance.

* * * * *